(12) United States Patent
Kikuchi et al.

(10) Patent No.: US 9,268,073 B2
(45) Date of Patent: Feb. 23, 2016

(54) LIQUID CRYSTAL DISPLAY DEVICE

(75) Inventors: Katsuhiro Kikuchi, Osaka (JP); Takashi Ochi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 579 days.

(21) Appl. No.: 13/518,284

(22) PCT Filed: Dec. 24, 2010

(86) PCT No.: PCT/JP2010/073438
§ 371 (c)(1),
(2), (4) Date: Jun. 21, 2012

(87) PCT Pub. No.: WO2011/081105
PCT Pub. Date: Jul. 7, 2011

(65) Prior Publication Data
US 2012/0262652 A1   Oct. 18, 2012

(30) Foreign Application Priority Data
Dec. 29, 2009   (JP) .................................. 2009-299202

(51) Int. Cl.
| | |
|---|---|
| *G02F 1/1335* | (2006.01) |
| *G02B 5/22* | (2006.01) |
| *G02F 1/1337* | (2006.01) |
| *G02F 1/139* | (2006.01) |

(Continued)

(52) U.S. Cl.
CPC .............. *G02B 5/223* (2013.01); *G02F 1/1393* (2013.01); *G02F 1/133512* (2013.01); *G02F 1/133514* (2013.01); *G02F 1/133707* (2013.01); *G02B 5/201* (2013.01); *G02F 2001/136222* (2013.01); *G02F 2201/121* (2013.01)

(58) Field of Classification Search
CPC ............ G02F 1/133514; G02F 1/1393; G02F 1/133707; G02F 2201/121; G02F 1/133512; G02F 2001/136222; G02B 5/223; G02B 5/201; G02B 5/22; G02B 5/20
USPC ...................... 349/106–107; 345/88
See application file for complete search history.

(56) References Cited

U.S. PATENT DOCUMENTS

| | | | |
|---|---|---|---|
| 5,434,690 A * | 7/1995 | Hisatake et al. | 349/8 |
| 5,666,179 A | 9/1997 | Koma | |
| 6,111,623 A * | 8/2000 | Sato | 349/106 |

(Continued)

FOREIGN PATENT DOCUMENTS

| | | |
|---|---|---|
| JP | 63-048521 | 3/1988 |
| JP | 6-301036 | 10/1994 |

(Continued)

OTHER PUBLICATIONS

Machine English translation of JP 2007171747.*

(Continued)

*Primary Examiner* — Hoan C Nguyen
(74) *Attorney, Agent, or Firm* — Nixon & Vanderhye P.C.

(57) ABSTRACT

The present invention provides a counter electrode (13) and an alignment controlling electrode opening (14) directly on a color filter colored layer (12) to produce a liquid crystal display device (1) of a vertical alignment (VA) display mode. The present invention includes no overcoat layer for the color filter colored layer (12), and adjusts the thickness, pigment concentrations and the like for the color filter colored layer (12) to achieve a wide color reproduction range and high alignment stability.

10 Claims, 13 Drawing Sheets

(51) Int. Cl.
  *G02F 1/1362* (2006.01)
  *G02B 5/20* (2006.01)

(56) References Cited

U.S. PATENT DOCUMENTS

| | | | |
|---|---|---|---|
| 6,144,434 A * | 11/2000 | Kim et al. | 349/130 |
| 6,281,955 B1 * | 8/2001 | Midorikawa et al. | 349/106 |
| 6,384,889 B1 | 5/2002 | Miyachi et al. | |
| 6,512,565 B1 * | 1/2003 | Lee et al. | 349/130 |
| 6,661,488 B1 * | 12/2003 | Takeda et al. | 349/117 |
| 6,724,452 B1 | 4/2004 | Takeda et al. | |
| 2002/0149728 A1 | 10/2002 | Ogishima et al. | |
| 2003/0063249 A1 | 4/2003 | Hoshino et al. | |
| 2003/0107695 A1 | 6/2003 | Kubo et al. | |
| 2004/0125296 A1 * | 7/2004 | Sasabayashi | 349/129 |

FOREIGN PATENT DOCUMENTS

| | | | |
|---|---|---|---|
| JP | 11-242225 | | 9/1999 |
| JP | 2000-047217 | | 2/2000 |
| JP | 2002-174814 | | 6/2002 |
| JP | 2003-167253 | | 6/2003 |
| JP | 2003-172946 | | 6/2003 |
| JP | 2005-055594 | | 3/2005 |
| JP | 2007-171747 | | 7/2007 |
| JP | 2007171747 | * | 7/2007 |

OTHER PUBLICATIONS

International Search Report for PCT/JP2010/073438, mailed Mar. 8, 2011.
Written Opinion of the International Searching Authority for PCT/JP2010/073438, mailed Mar. 8, 2011.

* cited by examiner

CENTER OF AXIAL SYMMETRY (AXIAL CENTER)

LIQUID CRYSTAL DISPLAY DEVICE

This application is the U.S. national phase of International Application No. PCT/JP2010/073438, filed 24 Dec. 2010, which designated the U.S. and claims priority to Japan Application No. 2009-299202, filed 29 Dec. 2009, the entire contents of each of which are hereby incorporated by reference.

TECHNICAL FIELD

The present invention relates to (i) a liquid crystal display element suitable for an information display that is high in definition and excellent in color reproducibility and (ii) a display device including that liquid crystal display element. More specifically, the present invention relates to a liquid crystal display device suitable for use in (i) small- to middle-sized mobile liquid crystal equipment to be mounted in a device, serving as the above display device, such as a mobile telephone, a personal digital assistant (PDA), portable game equipment, portable video equipment, in-vehicle navigation equipment, a video camera, and a digital camera or (ii) large-sized audio-visual liquid crystal display equipment such as a large-screen television measuring 30 or more inches diagonally.

BACKGROUND ART

There has been a constant progress in information infrastructure. People's lives have witnessed heavy infiltration of small- to middle-sized mobile liquid crystal equipment such as a mobile telephone, a PDA, a video camera, a digital camera, and an in-vehicle navigation. The majority of such mobile liquid crystal equipment includes a liquid crystal display device. In addition, the field of a large-sized flat-panel display has also witnessed highly active development and commercialization of a large-sized, large-screen liquid crystal television that is high in definition and excellent in resolution and that is thus high in contrast ratio. There has been a demand that such a liquid crystal display device should display a larger amount of information since equipment including such a liquid crystal display device mounted therein now handles a larger amount of information. The market has seen an increasing demand for achievement of an excellent display quality such as high contrast, wide viewing angle, high luminance, high color reproducibility, and high definition.

Much attention has been drawn to a liquid crystal display device including a liquid crystal layer of a vertical alignment (VA) display mode as a display mode that makes it possible to carry out a display that has high contrast and wide viewing angle. A liquid crystal display device of the vertical alignment (VA) display mode typically includes a vertical alignment film and a liquid crystal material having negative dielectric anisotropy. The VA display mode characteristically makes it possible to produce a high-contrast liquid crystal display device of a normally black (NB) display mode through a non-rubbing process.

(Conventional Art 1)

Patent Literature 1 cited below discloses a liquid crystal display device having a viewing angle characteristic that is improved by the arrangement of (i) generating an oblique electric field in the vicinity of an opening provided in a counter electrode that faces a pixel electrode across a liquid crystal layer and thus (ii) aligning, on the tilt, liquid crystal molecules present around vertically aligned liquid crystal molecules that are centrally located within the opening.

(Conventional Art 2)

Patent Literature 2 discloses, in order to remove, for example, an afterimage that is caused by an oblique electric field being non-uniformly generated in a display pixel and that is a problem posed in Patent Literature 1 and the like, a liquid crystal display device that includes a plurality of regularly arranged openings in a pixel electrode or in a counter electrode so as to have, inside a pixel, a plurality of liquid crystal domains each exhibiting an axial symmetry alignment.

(Conventional Art 3)

Patent Literature 3 discloses a vertical alignment liquid crystal display device (MVA liquid crystal display device) that includes, in a pixel electrode, (i) a plurality of slits (openings or notch sections) extending in parallel to one another or (ii) a plurality of projections (protruding sections) or depressions (hollow sections). This Patent Literature proposes a technique of providing alignment controlling means for regulating the direction in which liquid crystal molecules are tilted in response to voltage application, the alignment controlling means being provided in each of upper and lower substrates in a zigzag shape with respect to a pixel arrangement, that is, in two different directions in the respective upper and lower substrates. This technique thus achieves a four-domain alignment for a single pixel.

(Conventional Art 4)

Patent Literature 4 discloses a technique of regularly providing a plurality of protruding sections within a pixel to stabilize the alignment state in a liquid crystal domain, in which liquid crystal molecules are tilted and thus radially aligned around each protruding section as the center. This Patent Literature further discloses improving a display characteristic by, in addition to utilizing the above alignment controlling effect by the protruding sections, regulating the alignment of liquid crystal molecules with use of an oblique electric field due to an opening provided in an electrode.

(Conventional Art 5)

Patent Literature 5 discloses a technique related to a liquid crystal display device arranged such that, in order to stabilize the alignment state in a liquid crystal domain, (i) a color layer (colored layer) section of a color filter is removed from a portion including a slit structure provided in a counter electrode on the color filter and (ii) no planarizing film is provided for such a portion. This Patent Literature states that the use of the above structure can prevent the number of production steps from increasing due to the need to form a planarizing overcoat.

(Conventional Art 6)

Patent Literature 6 discloses a substrate technique for a liquid crystal display device including a color filter layer provided on a side of an active matrix (TFT) substrate on which side an array of active elements are provided. This Patent Literature proposes the above structure as a technique for improving display quality and reliability.

Citation List

Patent Literature 1

Japanese Patent Application Publication, Tokukaihei, No. 6-301036 A (Publication Date: Oct. 28, 1994)

Patent Literature 2

Japanese Patent Application Publication, Tokukai, No. 2000-47217 A (Publication Date: Feb. 18, 2000)

Patent Literature 3

Japanese Patent Application Publication, Tokukaihei, No. 11-242225 A (Publication Date: Sep. 7, 1999)

Patent Literature 4

Japanese Patent Application Publication, Tokukai, No. 2003-167253 A (Publication Date: Jun. 13, 2003)

Patent Literature 5

Japanese Patent Application Publication, Tokukai, No. 2002-174814 A (Publication Date: Jun. 21, 2002)

Patent Literature 6

Japanese Patent Application Publication, Tokukai, No. 2003-172946 A (Publication Date: Jun. 20, 2003)

SUMMARY OF INVENTION

Technical Problem

A display device requires a design with a pixel pitch of 200 μm or smaller for applications including a use (i) mainly as a small- to middle-sized liquid crystal display device and (ii) as a liquid crystal display device to be included in a large-screen television that is of a diagonally 30 to 40-inch class and that is an increasingly highly colorful, full high-definition (full HD) television. Such a requirement unfortunately poses such problems as below with display performance in the case where alignment controlling means is provided in such a pattern as in conventional art.

(Problem 1)

Arrangements such as that of Conventional Art 3, which provides a predetermined projection structure within a pixel, and Conventional Art 4 require forming a structure which, in terms of a cross-sectional structure with respect to an effective display region, occupies an area that is as much as 20% or more of the effective display region. Such arrangements thus tend to reduce the transmittance of a panel.

In the case where polarizing plates for the respective upper and lower substrates are so provided that respective absorption axes are orthogonal to each other, the above structure causes lack of light (dark portion) in its position. Further, since the above structure has a tilted surface, liquid crystal molecules present in the vicinity of that structure are so aligned as to tilt with respect to the tilted surface even when no voltage is being applied. This undesirably causes a light leak in a black display state.

Further, in the case where a slit opening is provided as an alignment controlling structure within a pixel, no electric field is applied to such an opening. This opening thus constantly causes a black display in, for example, the vertical alignment (VA) display mode, and problematically reduces the transmittance of a panel.

These problems cannot be overlooked in terms of contrast ratio, luminance characteristic and the like particularly in a small- to middle-sized liquid crystal display device or a full-HD, large-screen liquid crystal display device, each of which tends to have a smaller pixel pitch.

(Problem 2)

A typical technique for achieving a liquid crystal display having a wide viewing angle is a technique of providing a predetermined slit opening in a display electrode on a color filter substrate. A widely practiced application of such a technique involves forming (i) a counter electrode on an overcoat layer that is provided directly on a color layer of a color filter and that serves as a planarizing film and (ii) an opening in the counter electrode which opening is in the shape of, for example, a slit.

Providing no overcoat layer on the color layer of the color filter results in a state in which the color layer is in direct contact with members (such as an alignment film and a liquid crystal material) included in a liquid crystal layer. This state causes a pigment component to exude from the color layer to the liquid crystal layer, and thus contaminates the liquid crystal material. This contamination changes the orientation of liquid crystal molecules in pixel regions of respective color layers of R, G, and B, and thus increases the risk of inducing a defective alignment.

Adding a step of forming an overcoat layer on a color layer of a color filter, however, leads mainly to such problems as follows: First, an increase in the number of man-hours during production increases the production cost. Second, the inability to sufficiently maintain adherence between the color layer and the overcoat layer causes an obvious decrease in, for example, reliability of the display panel or production yield.

To solve these problems, Patent Literature 5 above, for example, proposes a technique of (i) removing a portion of the color layer which portion corresponds to an electrode opening within a pixel of a color filter substrate and (ii) providing a counter electrode film to cover an edge of the color layer which edge is present due to the above removal.

A typical liquid crystal display device of the vertical alignment (VA) display mode includes (i) a liquid crystal layer having a cell thickness of 3 to 4 μm and (ii) a color layer having a thickness of approximately 1.5 μm. Removing a portion of the color layer which portion corresponds to an electrode opening unfortunately causes, at that electrode opening, a thickness difference corresponding to the thickness of the color layer. In this case, such a thickness difference in the vicinity of the electrode opening significantly influences how the alignment state of the liquid crystal layer is changed. This raises much concern for alignment abnormality and light leak, for example. The above technique thus presumably requires, for instance, separately forming a light blocking layer.

This problem is posed in not only (i) the case where, as in a conventionally arranged liquid crystal display device, a color layer of a color filter is provided on a side of a counter substrate on which side an array of active elements are provided and which faces an active matrix (TFT) substrate, but also (ii) the case where a color layer is provided on an active matrix (TFT) substrate.

The present invention has been accomplished in view of the above problems, and provides a liquid crystal display device that includes a panel which is simply arranged as compared to that of conventional art and that can yet be high in display quality.

Solution to Problem

The present invention provides a liquid crystal display device of a vertical alignment (VA) display mode, the liquid crystal display device being basically configured to include (i) a color filter colored layer having an optimized thickness and an optimized specific resistance value and (ii) no overcoat layer covering the color filter colored layer.

More specifically, the present invention proposes a technique that can solve the above problems by, in a liquid crystal display device of the vertical alignment display mode which liquid crystal display device, to achieve a multidomain liquid crystal alignment, includes a predetermined electrode opening in at least a counter electrode provided for a counter substrate, simply adjusting the thickness and specific resistance value of the color filter colored layer, without providing an overcoat layer for the color filter colored layer, regardless of which of (i) a first substrate, which is provided with an active element, and (ii) a second substrate facing the first substrate and serving as the counter substrate is provided with the color filter colored layer.

Specifically, the invention described below is the main point.

The liquid crystal display device of the present invention is a liquid crystal display device of the vertical alignment display mode, in which (i) liquid crystal molecules are aligned substantially vertically between upper and lower substrates while either no voltage or a voltage lower than a threshold voltage is being applied, and (ii) liquid crystal molecules have a predetermined tilt alignment with respect to the thickness direction of a liquid crystal layer while a voltage not lower than the threshold voltage is being applied.

The present invention further includes, as a structure for regulating the alignment state of liquid crystal molecules, an electrode opening, such as a slit, that is provided in the counter electrode at a predetermined position.

The present invention additionally includes a color filter colored layer for each pixel. No overcoat layer for covering the color filter colored layer is provided between the color filter colored layer and the liquid crystal layer. This color filter colored layer characteristically has (i) a layer thickness within a range of not less than 1.8 μm and not greater than 3.2 μm and (ii) a specific resistance value of not less than $1.0 \times 10^{15}$ Ω·cm.

With the above arrangement, the liquid crystal display device displays an image by modulating the amount of light passing through the pixels. Liquid crystal molecules in each pixel are aligned to tilt, in response to a voltage application, in a direction substantially orthogonal to a line of electric force which line has been bent due to the electrode opening. This forms desired liquid crystal regions.

According to conventional art, a liquid crystal display device includes an overcoat layer above a color filter colored layer (hereinafter referred to as "colored layer") in order to, for example, (i) prevent the colored layer from contaminating the liquid crystal layer and (ii) reduce a thickness difference caused in the colored layer due to formation of an electrode opening.

Providing an overcoat layer for a colored layer, however, leads to a production disadvantage involved in new addition of a film formation step. Further, the arrangement including an overcoat layer provided for a colored layer problematically leads to poor adherence between the colored layer and the overcoat layer, which raises a concern about, for example, a resulting decrease in reliability and/or production yield.

The present invention has been made to solve problems occurring when a conventional color filter as above is prepared. The main point of the present invention is to provide (i) directly on a colored layer, an electrode made of a transparent electrode film such as an ITO (indium-tin oxide) film and (ii) an electrode opening in order to produce a high-quality liquid crystal display device through a simpler process without any influence on orientation in liquid crystal regions even with use of no overcoat layer, which is a member necessary for a conventional color filter.

The present invention particularly involves a main idea of providing a technique of (i) improving the arrangement of a color filter in order to further improve display quality of a liquid crystal display device of the vertical alignment display mode and thus (ii) improving both color reproducibility and reliability of such a liquid crystal display device. The present invention, to carry out such a technique, defines its colored layer as having a thickness within a range of not less than 1.8 μm and not greater than 3.2 μm.

The present invention sets the specific resistance value of the colored layer to a value of not less than $1.0 \times 10^{15}$ Ω·cm. The present invention can thus cause the center of axial symmetry (axial center) in a tilt alignment to be stably fixed at a predetermined position, and can easily achieve an all-direction alignment. The present invention can, as a result, achieve an object thereof.

A normal technique for improving a color reproduction range (NTSC ratio: Ratio established by the National Television System Committee. This indicates a ratio of occupation by the space of the three primary colors for a display object on the basis of a space of the three primary colors for a television) is, for example, to increase the concentration of a pigment in a colored layer or the thickness of the colored layer.

Setting a pigment concentration to an excessively high value, however, increases the tendency of a liquid crystal layer having reliability that is decreased due to, for example, a temporal change during operation. Increasing the layer thickness of a colored layer, on the other hand, increases an influence of variation caused when a colored layer is formed, and thus decreases smoothness of the colored layer, which may in turn cause a local disturbance in the alignment state of liquid crystal. These problems consequently lead to a display deficiency in a liquid crystal display device.

In view of the above problems, the present invention defines a suitable thickness for its color filter colored layer in order to achieve excellent color reproducibility and reliability in a liquid crystal display device and thus to achieve high display quality.

As described above, Patent Literature 5, in order to attain an object similar to an object of the present invention, proposes a technique of (i) removing a portion of a color layer (colored layer) section in a color filter which portion corresponds to a position at which a slit structure is provided in a counter electrode above the color filter and (ii) covering that color layer section with a counter electrode layer in a state in which the color layer section has a thickness difference.

This conventional technique, while it attains the object of omitting an overcoat layer, poses the problem discussed in Problem 2 above because it involves lack of a color layer in the vicinity of the position at which is provided a slit structure that serves to control the alignment in a liquid crystal domain. In other words, the above conventional technique causes a large thickness difference in the vicinity of the position at which a slit structure is provided, and consequently poses a problem of a local, large difference in the thickness of a liquid crystal layer.

Further, such a thickness difference locally caused in a liquid crystal layer causes an influence that leads to, for example, instability of the alignment state and/or a light leak in a liquid crystal region. As to this point, Patent Literature 5 discloses an embodiment that discusses problems such as a light leak, and proposes a specific technique of additionally providing a light-blocking film to solve such problems.

In contrast, the present invention, in order to attain the same object of omitting an overcoat layer, has no need to create a thickness difference in a counter electrode and in a colored layer below an electrode opening. Thus, the present invention, which can avoid display problems posed in Patent Literature 5, provides an extremely effective technique.

A combination of the arrangement of a particular claim with the arrangement of another claim is not limited to only a combination with the arrangement of a claim from which that particular claim depends, but may be, as long as an object of the present invention is achievable, a combination with the arrangement of a claim from which that particular claim does not depend.

Advantageous Effects of Invention

The present invention provides a liquid crystal display device which is characterized in that no overcoat layer for covering a color filter colored layer is provided between the color filter colored layer and a liquid crystal layer and in that the color filter colored layer has (i) a layer thickness of not less than 1.8 μm and not greater than 3.2 μm and (ii) a specific resistance value of not less than $1.0 \times 10^{15}$ Ω·cm.

The above arrangement can simplify a process of producing a liquid crystal display device and can thus reduce the cost of that liquid crystal display device. The above arrangement can further cause liquid crystal molecules in each pixel to have a tilt alignment in which the center of axial symmetry is stably fixed at a predetermined position within the pixel, and can thus easily achieve an all-direction alignment.

DESCRIPTION OF EMBODIMENTS (Embodiment)

Figure 1:
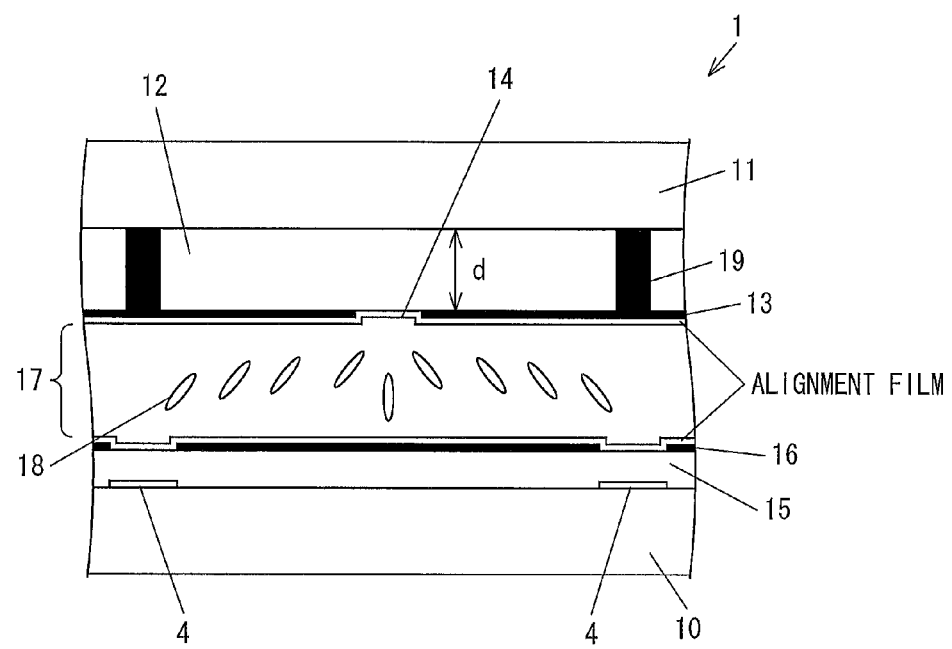
FIG. 1 is a cross-sectional view schematically illustrating a cross section, taken along line A-A' in FIG. 2, of a liquid crystal display device of an embodiment of the present invention.

An embodiment of the present invention is described below with reference to FIGS. 1 through 15. For convenience of explanation and the like, the drawings referred to below illustrate, in a simplified manner, only main members among the constituent members of an embodiment of the present invention which main members are necessary for description of the present invention. The members in the drawings have dimensions that are not faithful to, for example, the actual dimensions of the constituent members or dimension ratios for the constituent members.

(Pixel Configuration)

Figure 2:
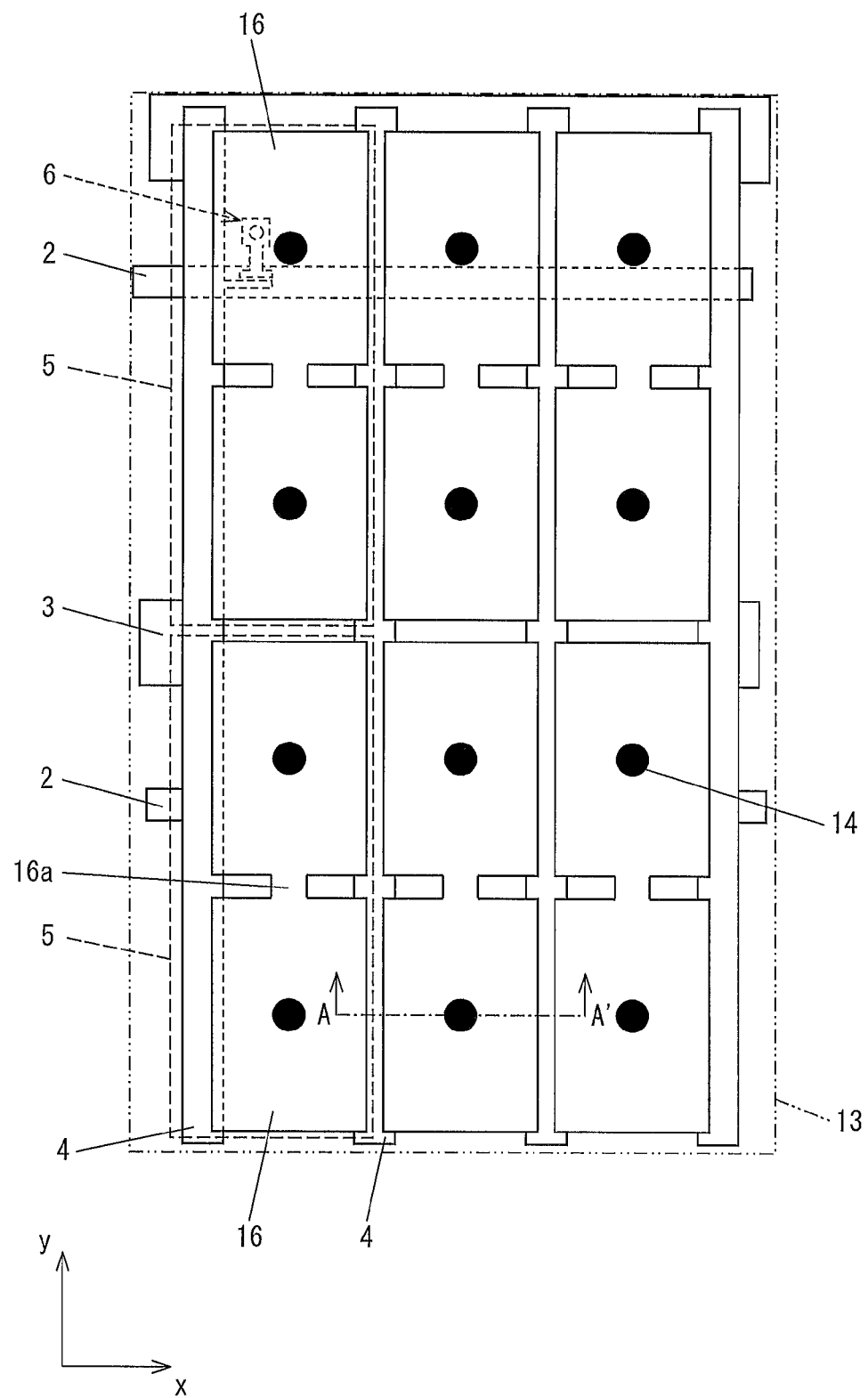
FIG. 2 is an enlarged plan view schematically illustrating a configuration of a single pixel in the liquid crystal display device.

FIG. 2 is an enlarged plan view schematically illustrating a configuration of a picture element in a liquid crystal display device 1 of the present embodiment. FIG. 1 is a cross-sectional view schematically illustrating a cross section taken along line A-A' in FIG. 2.

As illustrated in FIG. 2, the present embodiment uses (i) the term "X direction" to refer to a direction parallel to the direction in which gate lines 2 provided for the individual pixel regions and storage capacitor lines 3 extend and (ii) the term "Y direction" to refer to a direction orthogonal to the X direction, that is, a direction in which source lines 4 provided respectively for a R (red) pixel, a G (green) pixel, and a B (blue) pixel, which together constitute a single picture element.

The R pixel, the G pixel, and the B pixel are each in a stripe shape, and each include two sub-pixel regions 5 that are provided between adjacent source lines 4 and that are arranged next to each other in the Y direction. A single picture element is thus made up of three columns (for three colors) arranged in the X direction each of which three columns is in turn made up of two sub-pixel regions 5 arranged next to each other in the Y direction.

The picture element includes, in each sub-pixel region 5, a pixel electrode 16 which is so shaped that two rectangles are connected to each other by a connecting section 16a having a width smaller than the width of the rectangles. The picture element thus includes two pixel regions in each sub-pixel region 5.

As illustrated in FIG. 1, the liquid crystal display device includes, for each sub-pixel region 5: an active matrix substrate (first substrate) 10; a counter substrate (second substrate) 11 facing the active matrix substrate; a color filter colored layer 12 provided on the counter substrate; and a counter electrode (common electrode) 13 provided on the color filter colored layer. The liquid crystal display device includes, at each substantially central portion of the counter electrode 13 which substantially central portion corresponds to a substantially central portion of one of the two pixel regions in a sub-pixel region 5, an electrode opening 14 penetrating through the counter electrode 13. The liquid crystal display device further includes an alignment film so provided as to cover the counter electrode 13 and the electrode openings 14.

The liquid crystal display device includes: on the active matrix substrate 10, an insulating film 15 made of a transparent resin; a pixel electrode 16 on the insulating film; and an alignment film so provided as to cover the pixel electrode 16. The liquid crystal display device further includes a gap so provided between pixel electrodes 16 adjacent to each other in the X direction and the Y direction as to function as an electrode opening. The liquid crystal display device includes a predetermined spacer so provided on a light blocking section on each storage capacitor line 3 as to maintain the gap between the active matrix substrate 10 and the counter substrate 11. The two substrates 10 and 11 are attached to each other via a sealing resin.

With the above arrangement, applying a voltage to a liquid crystal layer 17 sandwiched between the counter electrode 13 and the pixel electrode 16 achieves a radial alignment, in which liquid crystal molecules 18 are aligned radially around each electrode opening 14 as the center.

The liquid crystal display device is arranged such that (i) a R pixel, a G pixel, and a B pixel, which together constitute a single picture element, are each selected with use of a gate signal applied to a corresponding gate line 2, and (ii) a R pixel, a G pixel, or a B pixel each to be driven is supplied with a video signal for a corresponding color through a corresponding source line 4 and a corresponding TFT 6 (thin film transistor) serving as an active element. A voltage applied to the liquid crystal layer 17 is retained for a certain period by a corresponding auxiliary capacitor formed by a storage capacitor line 3 and a pixel electrode 16.

FIG. 2 illustrates only one TFT 6 for convenience of illustration. In actuality, each of the R pixel, the G pixel, and the B pixel includes a TFT 6 in each of its sub-pixel regions 5.

The color filter colored layer 12 contains a black matrix 19 provided to individually define the R pixel, the G pixel, and the B pixel.

(Characteristics of Color Filter for Vertical Alignment (VA) Display Mode)

The present invention can use, as its color filter, a color filter colored layer 12 provided on the counter substrate 11 as described above. The present invention is, however, not limited to such an arrangement. For instance, the color filter colored layer 12 may alternatively be provided above the active elements on the active matrix substrate 10.

The above alternative arrangement, which can simplify the arrangement on the side of the counter substrate 11, can simplify the overall process of producing the liquid crystal display device 1, and advantageously makes it possible to mass-produce a display device that is high in aperture ratio and definition even with a slightly low accuracy in attaching the active matrix substrate 10 and the counter substrate 11 to each other.

The majority of conventional liquid crystal display devices include a color filter substrate prepared through a process involving both (i) a step of providing an overcoat layer on a color filter colored layer for protection of the color filter colored layer and (ii) a leveling step of eliminating a local thickness difference in the color filter substrate by further providing the overcoat layer. This leads to the known technique of providing a common electrode (counter electrode) on the overcoat layer.

A color filter substrate with a conventional structure as above additionally requires, in order to form an overcoat layer, (i) an application step involving, for example, a wet process or a dry process and (ii) a film formation step, with the result of an increase in the number of man-hours for production.

Providing an overcoat layer on a color filter substrate thus not only decreases cost effectiveness for substrate production, but also tends to cause film peeling due to a decrease in adherence of the color filter substrate to the color filter colored layer. The above provision may thus problematically lead to, for example, an obvious decrease in reliability, yield and the like.

The problems raised above can be solved by a technique provided by the present invention, which has an arrangement of, for example, including: a counter substrate 11; a color filter colored layer 12 provided on the counter substrate and having a predetermined thickness d (see FIG. 1) described below; and a counter electrode 13 provided directly on the color filter colored layer and having an alignment controlling electrode opening 14 at a specific position within each pixel region, the arrangement including no overcoat layer.

To solve the above problems, the present invention notably uses the liquid crystal display device 1 of the vertical alignment display mode, and defines the color filter colored layer 12 on the counter substrate 11 such that, for instance, (1) the color filter colored layer 12 includes a pigment at a concentration that is set within a predetermined range and (2) the color filter colored layer 12 has a film thickness that is set within a predetermined range.

Figure 3:
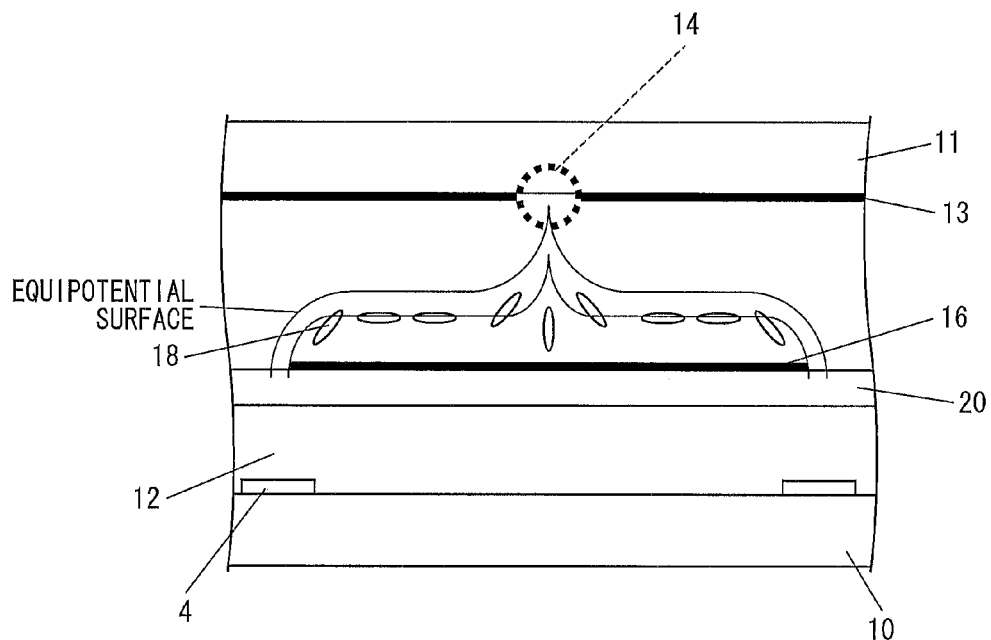
FIG. 3 is a cross-sectional view schematically illustrating a cross section of a conventional pixel in a COA structure, which includes a color filter colored layer provided on active elements on an active matrix substrate, the COA structure being provided with an overcoat layer on the color filter colored layer.

Further, the above alternative arrangement includes a color filter called COA (color filter on array). FIG. 3 is a cross-sectional view illustrating a conventional COA structure.

Figure 4:
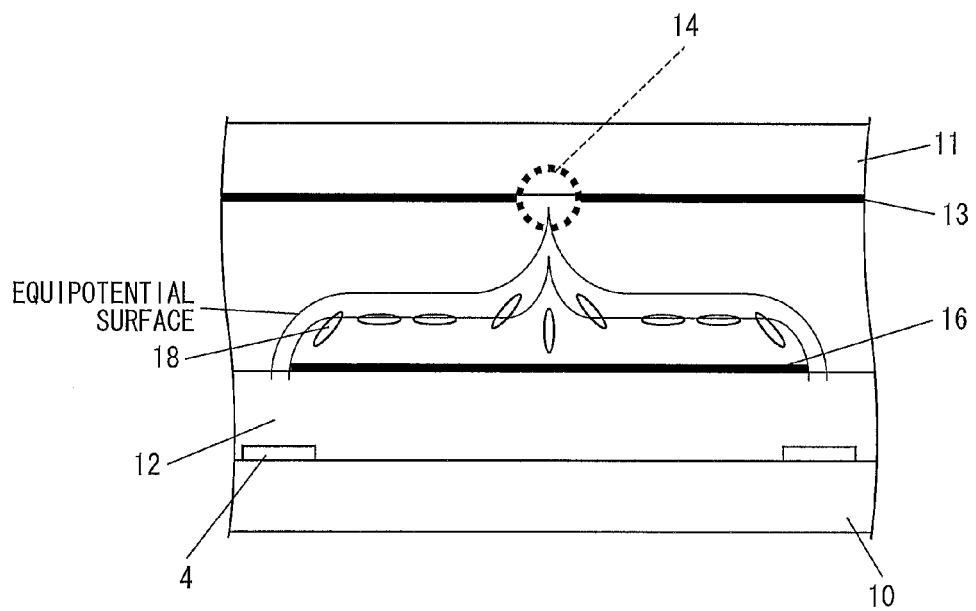
FIG. 4 is a cross-sectional view schematically illustrating a cross section of a pixel of the present invention, which includes no overcoat layer on a color filter colored layer in the COA structure.
Figure 5:
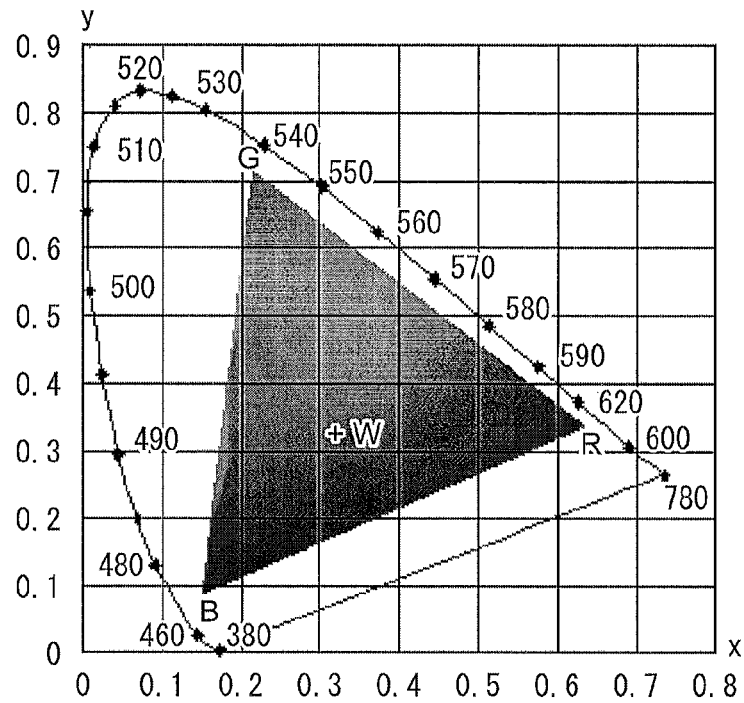
FIG. 5 is a chromaticity diagram schematically indicating a color reproduction range (in NTSC ratio) in a CIE1931 xy color system.

FIG. 4 is a cross-sectional view illustrating a COA structure of the present invention. Members in these drawings that correspond to respective equivalents described above with reference to FIG. 1 are each assigned a common reference numeral for convenience.

As illustrated in FIG. 3, a normal COA structure includes, for example: a glass substrate serving as an active matrix substrate 10; line metal, including source lines 4, and TFT elements both provided on the glass substrate; a color filter colored layer 12 so provided as to cover the line metal and the TFT elements; and, above the color filter colored layer, (i) an insulating layer 20 such as an overcoat layer and (ii) an ITO electrode serving as a pixel electrode 16. Such a normal COA structure further includes: a glass substrate serving as a counter substrate 11; and an ITO electrode provided on the glass substrate and serving as a counter electrode 13. The counter electrode 13 includes, at its substantially central portion corresponding to a substantially central portion of a corresponding sub-pixel region, an electrode opening 14 penetrating through the counter electrode 13.

The present invention, in contrast, uses a COA structure that includes, as illustrated in FIG. 4, a color filter colored layer 12 having an increased specific resistance value and that thus enables generation of an oblique electric field without including an overcoat layer. This structure advantageously makes it possible to mass-produce, through a simple process, a display device that is high in aperture ratio and definition.

(Color Reproducibility of Color Filter)

If the pigment in the color filter colored layer 12 has a concentration within a range lower than the above predetermined range, it is possible to prevent a display deficiency caused by an influence such as contamination of the liquid crystal layer 17 by the color filter colored layer 12. Setting the concentration of the pigment to be lower than the predetermined range, on the other hand, leads to a decrease in the color expressing ability of the color filter colored layer 12, and thus reduces the color reproduction range.

A display medium is capable of displaying colors within a range, which is called color purity. This color range can be expressed with use of, for example, an xy chromaticity diagram based on a CIE1931 xyY color system. This xy chromaticity diagram represents any color by (i) a two-dimensional plane based on x and y and (ii) a Y value indicative of lightness. A liquid crystal display device displays a color that is expressed by additive color mixture in which the three primary colors of R, G, and B are mixed. The xy chromaticity diagram defines a color reproduction range as the area of the triangle formed by the color coordinates of each of the three primary colors.

The color reproduction range of a liquid crystal display device can normally be expressed in percentage notation as an NTSC ratio based on the NTSC color space, which is widely used in, for example, Japan and the US. The NTSC color space refers to the color space of a television standardized by the NTSC. The color coordinates (x, y) of the three primary colors are expressed as R (0.67, 0.33), G (0.21, 0.71), and B (0.14, 0.08) respectively. The NTSC ratio thus indicates the proportion that the display color space of a target liquid crystal display device occupies with respect to the NTSC color space illustrated in FIG. 5 and serving as a reference. A larger value for the color reproduction range typically denotes more hue options, and thus tends to allow a deeper hue to be expressed.

A conventional cathode ray tube (CRT) monitor has a color reproduction ability of 72% in NTSC ratio. The NTSC ratio of 72% is thus set as a target guideline value for improvement of display quality for a liquid crystal display device. With importance placed on the panel luminance, a liquid crystal display device preferably achieves at least 65% in NTSC ratio in consideration of, for example, a decrease in color purity which decrease is attributed to an increase in lightness.

Generally, there presumes to be a trade-off relation between (i) color purity or color density and (ii) luminance or lightness. This is due to the following: A color filter substrate with a colored layer including a given pigment requires its colored layer to be larger in thickness in order to express a deeper hue. Such a thicker colored layer, however, decreases the amount of light passing through the substrate, and consequently tends to decrease the overall luminance of the display device.

Thus, in order to produce a display device that carries out a display which is vivid in color, there is a need to design the characteristic of a color reproduction range to achieve the value of at least 65% in NTSC ratio. This need indicates that it is crucial to set, for example, the concentration and thickness of a color filter colored layer within respective predetermined ranges.

A normal relation between the characteristic of a colored layer in a color filter and the hue of the colored layer shows a tendency in which a higher color density in a given colored layer results in a low lightness and a low specific resistance value for the colored layer. A typical color filter for use in a liquid crystal display device includes a colored layer in which the green (G) range is higher in density than the other ranges, namely the red (R) range and the blue (B) range. The green (G) range is thus lower in specific resistance value than the other ranges. This indicates that, to simultaneously (i) keep a balance between the color reproduction range of a liquid crystal display device and its luminance and (ii) optimize the color reproduction range and the luminance, it is important to pay attention to color design for mainly the green (G) range.

When an evaluation has been performed, with respect to, for example, a given thickness for a colored layer, of the relation between (i) the color reproduction range (in NTSC ratio) of a colored layer in the green (G) range for each of various liquid crystal display devices having respective color designs different from one another and (ii) the lightness (Y value) for that green (G) range, such an evaluation observes that a wider color reproduction range (in NTSC ratio) achieves a sharper image, but decreases the lightness (Y value) of the green (G) range. A lightness (Y value) of lower than 50% for the green (G) range typically necessitates preventing a decrease in the luminance of the liquid crystal display device. The lightness (Y value) is thus preferably set to 50% or higher.

The above discussion leads to the conclusion that in consideration of the relation between the color reproduction range and the lightness, it is important that a liquid crystal display device, for improvement of its display quality, at least have (i) a color reproduction range (in NTSC ratio) of 65% or higher and (ii) a lightness (Y value) for the green (G) range within a range of 50% or higher.

Figure 6:
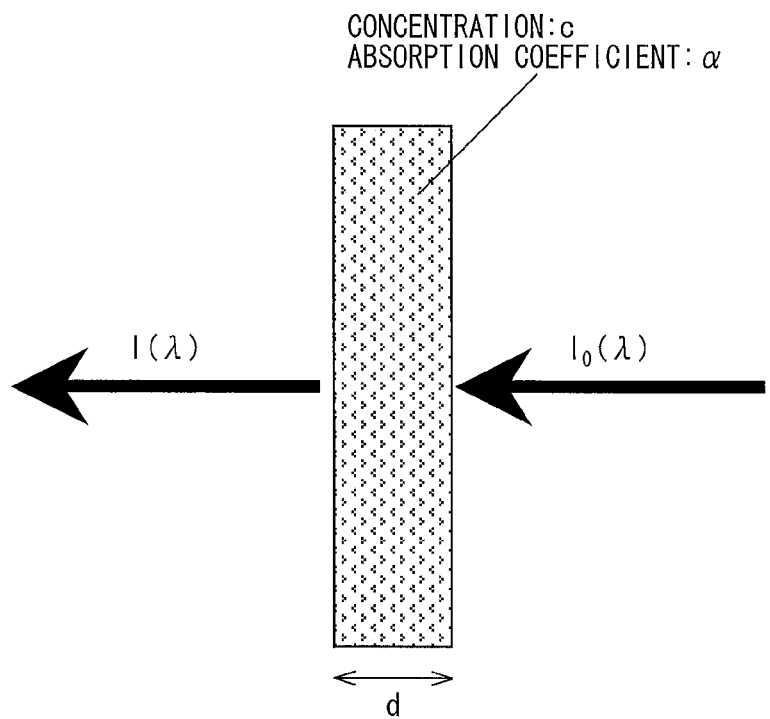
FIG. 6 is an explanatory diagram illustrating a relation between light entering a medium and light exiting the entering light.

(Design of Color Filter) Light, when entering and exiting a light absorbing medium, satisfies a relation between the intensity of the light and the thickness and concentration of the light absorbing medium, which relation can be derived from the schematic diagram in FIG. 6 in accordance with Lambert-Beer's law.

Specifically, a light absorbing medium has a transmission spectrum that can be expressed by the following Formula 1:

$$I(\lambda)/I_0(\lambda) = T(\lambda) = \exp\{-\alpha(\lambda) * c * d\} \qquad \text{(Formula 1)},$$

where (i) the transmittance $T(\lambda)$ refers to the proportion of the intensity $I(\lambda)$ of exiting light with respect to the intensity $I_0(\lambda)$ of entering light, (ii) c represents the concentration of the light absorbing medium including its base material, (iii) d represents the thickness (optical path length) of that medium, and (iv) $\alpha(\lambda)$ represents an absorption coefficient unique to the light absorbing medium including its base material.

The above relation of Formula 1 derived in accordance with Lambert-Beer's law can apply also to consideration of a transmission spectrum for the case in which light enters and exits a color filter.

A color filter currently for use mainly in a liquid crystal display device and the like, in the case where the color filter is of a pigment dispersed type, includes a transparent resin layer as a base material, the transparent resin layer containing, dispersed at a predetermined concentration, a pigment having a coloring ability. Such a resin layer used as a base material is typically designed to absorb almost no light. Thus, a in the above formula can be approximated to 0 in a visible range, and the transmission spectrum can be determined on the basis of only (i) the concentration of each kind of a pigment to be used and (ii) the thickness of the color filter.

A pigment for use in a red (R) color filter, for example, absorbs light in a visible-light, short-wavelength range corresponding to a range from the blue range to the green range, and tends not to absorb light in a long-wavelength range corresponding to the red range. The red color filter is red in color as a result. In other words, for such a pigment for the color red, the absorption coefficient $\alpha$ in Formula 1 above is characteristically large within the short-wavelength range and small within the long-wavelength range.

Further, selecting one from among various kinds of pigments makes it possible to adjust the transmission spectrum to a desired design value through adjustment of the concentration of the pigment and the optical path length. This can change the overall hue for the display device.

In an example case of a pigment having an absorption coefficient of (i) 0 for the red (R) range and (ii) a certain value for the range from the blue (B) range to the green (G) range, a larger thickness for the color filter or a higher concentration for the pigment results in a lower transmittance for the range from the blue (B) range to the green (G) range, but results in no change to the transmittance of the red (R) range, which consequently causes the color red (R) to be darker.

A lower concentration for the pigment or a smaller thickness for the color filter, on the other hand, results in no change to the transmittance for the color red, but results in a gradually higher transmittance for the other colors, which consequently causes the color red to be lighter. Further, the relation of Formula 1 above involves multiplication of the concentration and the thickness. Thus, as long as the multiplication gives a fixed value, for example, even if the concentration is halved, if the thickness doubles, the transmission spectrum is theoretically unchanged and the hue remains the same.

The following supplementally describes the relation between (i) the absorption coefficient $\alpha$ and (ii) the transmittance and the transmission spectrum. The absorption coefficient $\alpha$ is wavelength-dependent; in other words, a is a wavelength function. A red color filter, for example, has a of (i) substantially 0 within a wavelength range corresponding to the color of red and (ii) a large value within a wavelength range corresponding to the colors of blue and green. Thus, a larger film thickness d for the color filter results in almost no change to the transmittance within the red wavelength range, but results in a great change to the transmittance within the other wavelength ranges, which consequently changes the transmission spectrum of the visible range.

The above discussion derives a relation indicating that (i) selecting a pigment concentration and a film thickness determines the transmission spectrum and that (ii) the transmittance of the red wavelength range, for example, is constant regardless of the film thickness d.

A liquid crystal display device of the vertical alignment display mode is arranged such that applying a voltage between upper and lower substrates causes liquid crystal molecules in the liquid crystal layer to be aligned along an equipotential surface in correspondence with the electric field strength due to an electroclinic effect (see FIGS. 3 and 4). Such a liquid crystal display device notably uses a technique of, in order to uniformly aligning liquid crystal molecules in an efficient manner in response to a voltage modulation, providing a predetermined alignment controlling structure to regulate the electroclinic direction of the liquid crystal molecules. A known example of such a technique is to provide (i) a projection structure or (ii) an electrode opening such as a slit. The present invention provides, to at least one of an individual counter electrode and an individual pixel electrode, (i) an electrode opening such as a round hole and a slit or (ii) a notch section.

The present invention prepares a color filter substrate for the vertical alignment display mode with use of (i) a colored layer for the colors of red (R), green (G), and blue (B) and (ii) counter electrodes each including an electrode opening provided in itself. The present invention has an object of, by use of such a color filter substrate, providing a liquid crystal display device that has a color reproduction range (in NTSC ratio) of at least 65% and that is thus excellent in color reproducibility. The present invention defines the display color characteristic for the green (G) range on the basis of an xy chromaticity diagram that is based on a CIE1931 xyY color system and that is defined within a 2° visual field with use of a D65 light source.

The inventors of the present invention conducted a comparative study of display performance of, in particular, a liquid crystal display device of the vertical alignment display mode which liquid crystal display device is arranged as illustrated in FIGS. 1 and 2 to include a color filter colored layer in which the overcoat layer is removed.

The study involved selecting a pigment to achieve a color reproduction range (in NTSC ratio) of at least 65% and compared the following two cases:

(1) The concentration of the pigment was adjusted with the color filter colored layer 12 having a thickness d of 1.5 μm, which is equivalent to the thickness of a conventional color filter colored layer.

(2) The value of the color reproduction range was adjusted with an increased thickness d of 2.5 μm and a lower pigment concentration.

Figure 7:
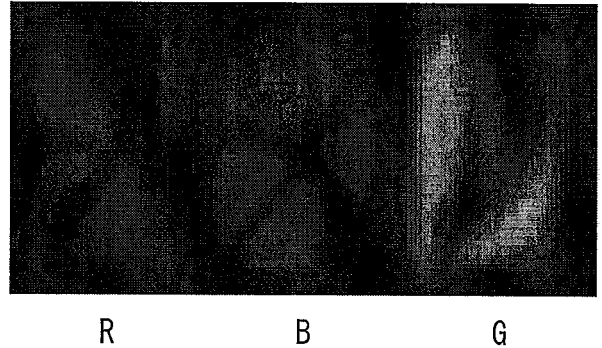
FIG. 7 is a photograph of alignment behavior in an individual pixel for a case in which (i) pigment concentrations are adjusted with a color filter colored layer having a thickness of 1.5 μm, which is equivalent to a conventional thickness, and (ii) a white-display voltage is applied.
Figure 8:
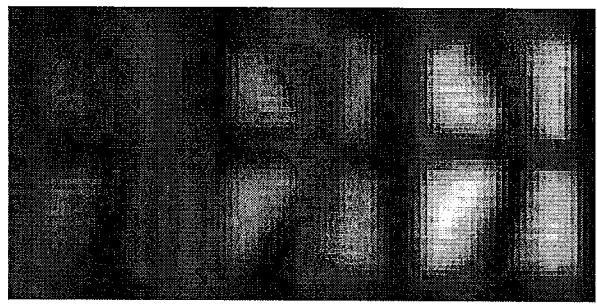
FIG. 8 is a photograph of alignment behavior in an individual pixel for a case in which (i) the color filter colored layer has an increased thickness of 2.5 μm and pigment concentrations are decreased to adjust the value of the color reproduction range and (ii) a white-display voltage is applied.

FIGS. 7 and 8 correspond to the above cases (1) and (2), respectively, and are each a photograph showing the alignment state in a pixel region with a corresponding electrode opening 14 at the center which alignment state was achieved in response to a voltage application (that is, in response to a white-display voltage application).

The case (1), as illustrated in FIG. 7, shows a dark line of a substantially identical shape for the red (R) pixel and the blue (B) pixel. Specifically, the dark line has the shape of ×, which has its center located substantially at the center of a corresponding pixel region. The dark line of that shape indicates a radial alignment of liquid crystal molecules 18.

The green (G) pixel, on the other hand, differs from the pixels of the other colors in that it has no definite alignment center, and thus fails to achieve a radial alignment. This alignment deficiency of the green (G) pixel causes a picture element constituted by the respective pixels of R, G, and B to have a region having a visible display deficiency, with the result of a decreased yield and image sticking.

In contrast, the case (2), as illustrated in FIG. 8, shows a similar alignment for all the pixel regions of red (R), green (G), and blue (B), and thus causes no alignment deficiency. Specifically, each of the pixel regions shows a dark line in the shape of a cross, which has its center located substantially at the center of a corresponding pixel region.

The case (2) uses a pigment concentration corresponding to a low pigment concentration of 60% for the case in which the colored layer has a thickness of 1.5 μm.

The difference in alignment state between the pixels of red (R), green (G), and blue (B) is normally attributed to the fact that those pixels have their respective pigment concentrations different from one another in the first place. Specifically, the above difference is attributed to the fact that the green (G) pixel normally has a pigment concentration that is far higher than those of the pixels of the other colors as described above. A green (G) pixel thus may include a liquid crystal material that has a disturbed alignment state due to, for example, contamination of the liquid crystal material by contact between (i) a colored layer including a pigment dispersed therein and (ii) the liquid crystal material. Such a disturbed alignment state causes a significant display deficiency. Thus, adjusting the thickness of the color filter colored layer 12 within a predetermined range as in the present invention produces an effect of preventing the above-mentioned alignment deficiency for particularly the green (G) pixel.

The inventors of the present invention studied a thickness for the color filter colored layer 12 which thickness allows a stable alignment state to be achieved for each of the pixels of red (R), green (G), and blue (B), and has consequently proved that the thickness is preferably not less than 1.8 μm and not greater than 3.2 μm. This can be derived from the observation below.

Figure 9:
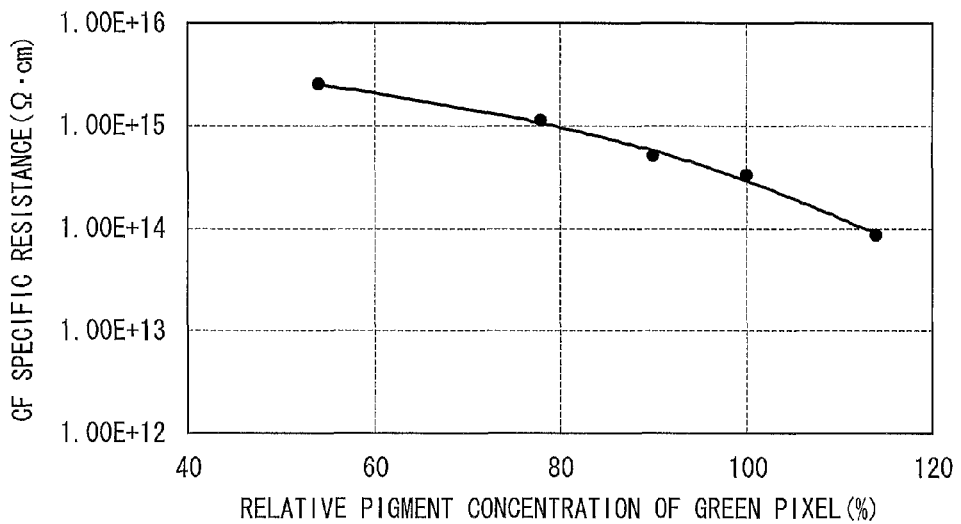
FIG. 9 is a graph indicating a relation between (i) the relative pigment concentration for green (G) and (ii) the specific resistance value for a color filter substrate in reference to a pigment concentration of a green (G) pixel with a colored layer having a thickness of 1.5 μm.

The description below discusses a color filter (CF) that includes a pigment of a certain type and that achieves a color reproduction range of at least 65% in NTSC ratio. FIG. 9 illustrates a relation between (i) the pigment concentration for green (G) and (ii) the specific resistance value of a color filter colored layer under an initial setting of the pigment concentration being 100% for a case in which a conventional green (G) pixel includes a colored layer having a thickness of 1.5 μm.

Figure 10:
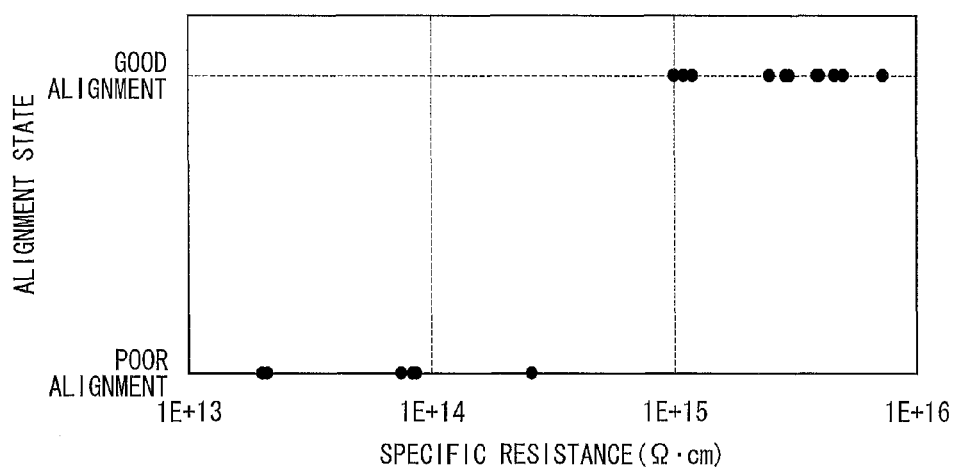
FIG. 10 is a graph indicating a relation between (i) the specific resistance value for a color filter substrate and (ii) whether a stable radial alignment can be achieved for cases in which the specific resistance value is changed under various conditions.

FIG. 10 illustrates a relation between (i) the specific resistance value of a color filter colored layer and (ii) whether a stable radial alignment is achieved under various conditions based on the specific resistance value. FIG. 10 shows results suggesting that achieving a stable alignment state in a liquid crystal region requires a high specific resistance value of not less than $1.0 \times 10^{15}$ (Ω·cm).

The green (G) pigment concentration that allows such a suitable specific resistance value to be achieved is derived from the above-described relation of FIG. 9 as crucially not greater than approximately 80% of the above initial setting.

Applying to this case the above relation of Formula 1 derived in accordance with Lambert-Beer's law determines an optimum thickness d for the color filter colored layer 12 to be not less than 1.8 μm.

The specific resistance value can be measured by carrying out a publicly known technique such as a direct-current four-terminal method with respect to a color filter colored layer including a target pigment component. The present invention quantitatively determined a specific resistance value through, as an example, a measurement involving (i) as an evaluation sample, a predetermined color filter colored layer at room temperature and (ii) a high-sensitivity source meter (Model 6430 produced by Keithley Instruments Inc.).

On the other hand, an actual production process, with, for instance, an increase in the thickness of a color filter colored layer, poses a larger problem with (i) a step of uniformly dispersing a necessary amount of a pigment in a base resin or with (ii) a step of uniformly forming a colored resin and patterning the colored resin. In particular, an actual production process poses a large number of problems in terms of, for example, uniformity and production yield. The thickness of a colored layer is practically controllable within an appropriate range smaller than the upper limit value of 3.2 μm.

As a result of the above study, the present invention defines a suitable thickness for the color filter colored layer 12 as not less than 1.8 μm and not greater than 3.2 μm. The thickness of the color filter colored layer 12 may, on the basis of the results shown in FIG. 8, be within a range of not less than 1.8 μm and not greater than 2.5 μm, or alternatively be within a range of not less than 2.5 μm and not greater than 3.2 μm.

(Variation of Electrode Opening)

The present embodiment, as described above, deals with features of the arrangement of a liquid crystal display device of the vertical alignment display mode which liquid crystal display device includes a circular electrode opening at a substantially central portion of a counter electrode to achieve at least one radial liquid crystal alignment within each pixel.

The present invention may alternatively be arranged to include another alignment controlling structure. For example, the present invention may include, in respective upper and lower substrates, linear and periodically bent alignment controlling structures that extend in respective directions different from each other. Further, the alignment controlling structures in the upper substrate are combined alternately with the alignment controlling structures in the lower substrate in parallel thereto. This arrangement achieves a four-domain alignment within each pixel. This arrangement includes, in a counter electrode, an electrode opening that is in the shape of a periodic zigzag having a bent line. The other features, including that of the range of an optimum thickness for a colored layer, may be identical to those described above.

The present invention may, in another variation, include, for example, a fine slit opening periodically provided in a substrate in a fishbone shape.

(Mechanism by which Display Deficiency Occurs in Green (G) Range and Measure Against it)

As mentioned above, an increase in the pigment concentration for a given colored layer tends to simultaneously (i) decrease pixel lightness and (ii) decrease the specific resistance value of a colored layer. Further, the pigment concentration for the green (G) range is often designed to be higher than that of any other color region in order to achieve a desired color reproduction range, and is thus problematically likely to have a low specific resistance value.

A typical color filter substrate thus normally has, for the green (G) range, a pigment concentration that is higher than that of any other color region as a result of consideration of chromaticity balance and white balance. The description below deals with a specific resistance value for the green (G) range, and is important for achievement of an object of the present invention.

Figure 11:
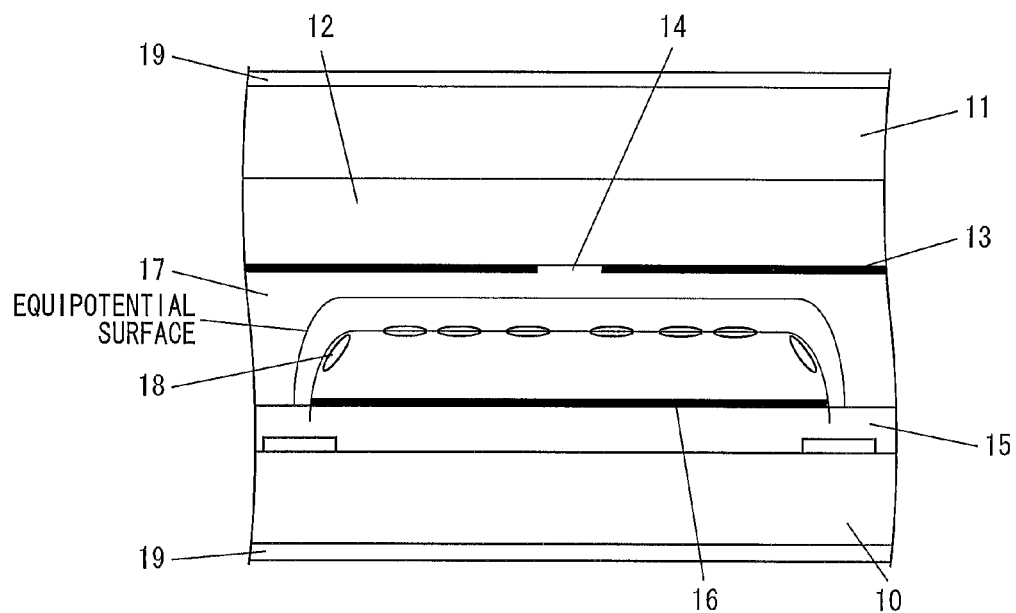
FIG. 11 is an explanatory view illustrating how an equipotential surface is formed in a liquid crystal layer for a case in which a color filter colored layer having the configuration of FIG. 1 has a low specific resistance value.

If a color filter substrate includes a colored layer having a low specific resistance value, the color filter colored layer 12 normally fails to act as an insulator at a portion corresponding to an electrode opening 14 in a counter substrate 11 as illustrated in FIG. 11. Consequently, no equipotential surface slides into the electrode opening 14, and thus no oblique electric field is generated. This tends to cause liquid crystal molecules 18 within that pixel to have an unfixed alignment direction and thus have an unstable state.

Figure 12:
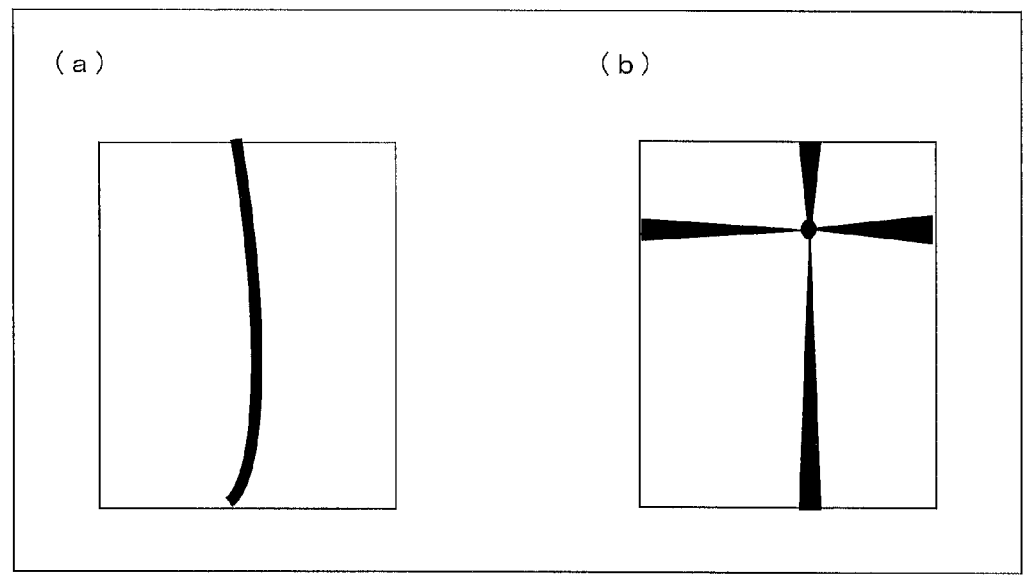
FIG. 12 shows diagrams each schematically illustrating a result of observing an alignment state of liquid crystal molecules in a pixel region through a pair of linear polarizing plates having respective absorption axes orthogonal to each other, where (a) illustrates a state in which (i) liquid crystal molecules within a pixel have an unfixed electroclinic direction in response to an application of a predetermined white-display voltage and thus (ii) no axial center is formed, and (b) illustrates a state in which the center of axial symmetry (axial center) is not positioned fixedly in the vicinity of a central portion of an opening, and is thus formed at a random position within the pixel.

In this state, providing a pair of linear polarizing plates 19 that are orthogonal to each other and that are arranged vertically across the liquid crystal layer 17 leads to observation of a stronger tendency of exhibiting a disturbed alignment state as in (a) and (b) of FIG. 12.

(a) of FIG. 12 illustrates a state in which (i) liquid crystal molecules 18 within a pixel have an unfixed electroclinic direction in response to an application of a predetermined voltage and thus (ii) no center of axial symmetry (axial center) has been formed. This can be a factor for (i) a response speed being low for not only a display in a static state achieved in response to a white-display voltage application, but also a display between halftone states which display requires a small voltage change, and (ii) display quality being decreased for an oblique direction due to a defective alignment state.

(b) of FIG. 12 illustrates a state in which, while liquid crystal molecules 18 within a pixel are tilted in response to an application of a predetermined voltage to achieve an axially symmetrical alignment to an extent, that alignment has an axial center which is (i) not fixedly positioned in the vicinity of a central portion of an electrode opening 14, but is (ii) formed at a random position within the pixel. This case also involves an axial center which is not fixed in the vicinity of the center of an electrode opening 14. Thus, this case, as well as the case illustrated in (a) of FIG. 12, may cause (i) a problem of a display deficiency or a low response speed in response to a white-display voltage application or between halftone states and/or (ii) a problem of, for example, display roughness attributed to a shift of the center of axial symmetry (axial center).

Figure 13:
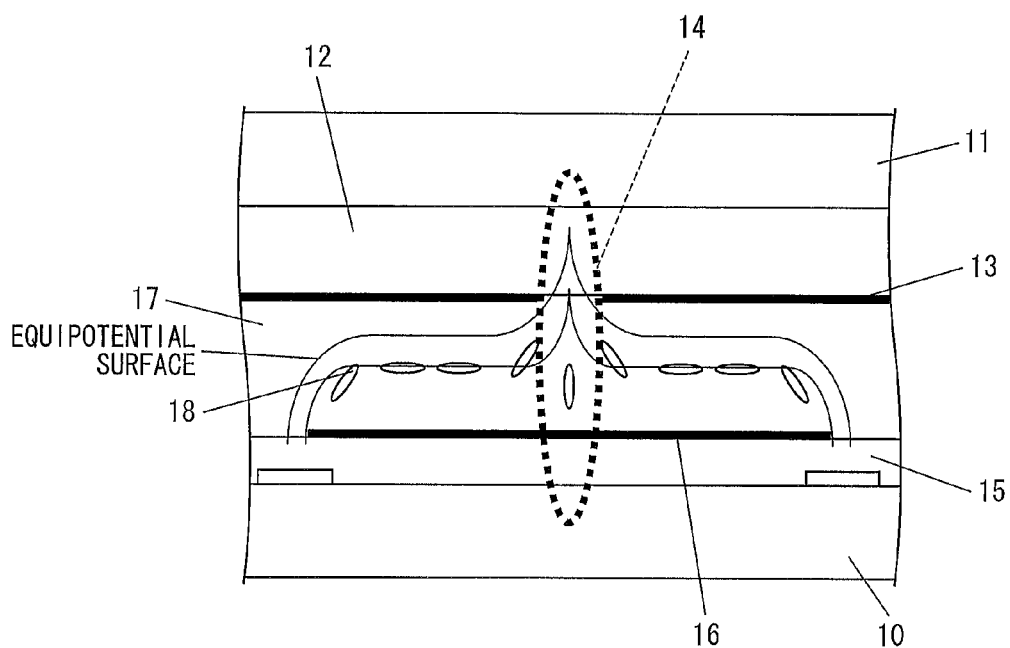
FIG. 13 is an explanatory view schematically illustrating a mechanism by which an alignment deficiency occurs in a liquid crystal layer having the configuration of FIG. 1, the explanatory view particularly concerning a case in which the color filter colored layer has a sufficiently high specific resistance value.

On the other hand, in the case where the color filter colored layer 12 has a sufficiently high specific resistance value that satisfies a predetermined range defined in the present invention, no line of electric force is generated in an electrode opening 14 provided in the counter substrate 11 (see FIG. 13). Consequently, an equipotential surface slides into the electrode opening 14, and an oblique electric field is generated. This causes liquid crystal molecules 18 within a pixel to tend to tilt to be parallel to the equipotential surface. The liquid crystal molecules 18 thus have a fixed tilt direction in the vicinity of a central portion of the electrode opening 14. In this case, an equipotential surface for each pixel is focused, with the center corresponding to the vicinity of the electrode opening 14, in a direction normal to a corresponding counter electrode 13.

Figure 14:
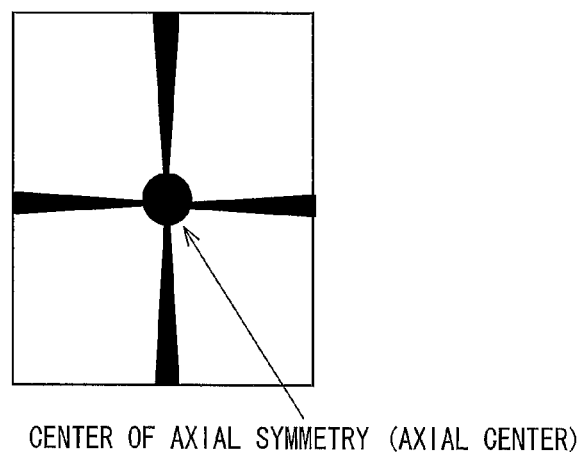
FIG. 14 is a diagram schematically illustrating a result of observing, through a pair of linear polarizing plates having respective absorption axes orthogonal to each other, a state in which (i) the center of axial symmetry (axial center) is positioned fixedly in the vicinity of a central portion of an opening in response to an application of a predetermined white-display voltage and (ii) an axially symmetrical alignment that is normal and stable has thus been achieved.

In this state, providing a pair of linear polarizing plates that are orthogonal to each other and that are arranged vertically across the liquid crystal layer 17 leads to observation of achievement of a radial, axially symmetrical alignment that has an axial center fixedly located at the center of the pixel region and that is normal and stable (see FIG. 14).

The description below outlines, with reference to (a) through (c) of FIG. 15, an influence caused in a liquid crystal display device by variation in the specific resistance value of a color filter colored layer onto the alignment state in the liquid crystal layer. (a) through (c) of FIG. 15 each show a diagram that schematically illustrates the center of axial symmetry (axial center) within a pixel and that, in order to clearly show an observed state for a "region (corresponding to the position of the axial center) in which no liquid crystal molecules are tilted due to an electric field", is an example which involves (i) use of a circularly polarized light plate and (ii) observation under a light microscope.

The following studies a state in which a white-display voltage is being applied to the liquid crystal display device of the present invention. In the case where the color filter colored layer has a specific resistance value that is sufficiently lower than a predetermined value, the sliding of an equipotential surface into an electrode opening is extremely small as illustrated in (a) of FIG. 15. Consequently, an equipotential surface tends to be (i) formed substantially in parallel to the substrate and thus (ii) not angled. This indicates almost no presence of the "region (corresponding to the position of the axial center) in which no liquid crystal molecules are tilted due to an electric field".

This case shows a tendency in which liquid crystal molecules present at a peripheral portion of the pixel first start to tilt in response to a voltage application, and thus leads to conflict between electroclinic alignments in various directions. This case, as a result, lets the center of axial symmetry (axial center) be formed at a random position within the pixel. This state shows an extremely small tendency of the center of axial symmetry (axial center) being formed for each pixel at a stably fixed position, and thus causes a problem of, for example, a display deficiency and/or display roughness.

Figure 15:
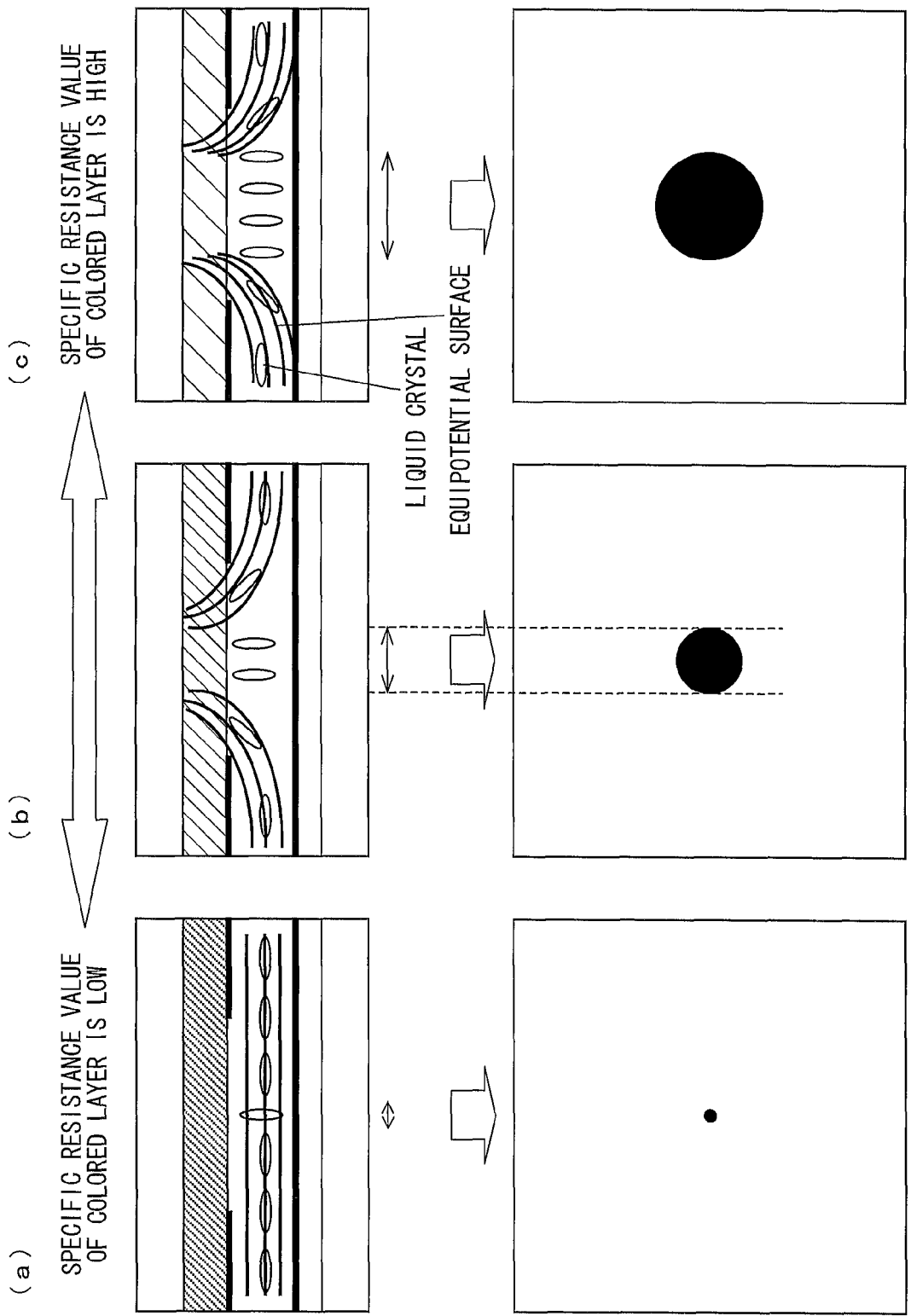
FIG. 15 shows diagrams schematically illustrating a mechanism by which an axially symmetrical alignment is achieved with respect to various specific resistances for a colored layer included in a color filter colored layer, where (a) illustrates a state in which the color filter colored layer has a specific resistance value that is sufficiently lower than a predetermined value, (b) illustrates a state in which the color filter colored layer has a specific resistance value that is slightly lower than a predetermined, allowed lower limit value, and (c) illustrates a state in which the color filter colored layer has a specific resistance value that is not less than the predetermined, allowed lower limit value.

(b) of FIG. 15 is a diagram outlining an example state in which the color filter colored layer has a specific resistance value that is slightly smaller than a predetermined, allowed lower limit value. This case involves an equipotential surface that slides into an electrode opening in response to a voltage application at an angle and a concentration that are relatively small. Consequently, the "region (corresponding to the position of the axial center) in which no liquid crystal molecules are tilted due to an electric field" is small, and the center of axial symmetry (axial center) is low in stability.

(c) of FIG. 15 is a diagram outlining an example state in which the color filter colored layer has a specific resistance value that is not less than the predetermined, allowed lower limit value. This case involves an equipotential surface that slides into an electrode opening in response to a voltage application at an angle and a concentration that are large. Consequently, the "region (corresponding to the position of the axial center) in which no liquid crystal molecules are tilted due to an electric field" is relatively large, and the center of axial symmetry is stably formed.

As described above, the use of a technique disclosed in the present invention (i) easily and stably achieves an axially symmetrical liquid crystal alignment, which is an alignment for all directions, and thus (ii) achieves a characteristic of a wide viewing angle. This phenomenon is further discussed in a section below on the basis of an examination involving an electric field simulation.

The above mechanism causes, for example, disturbance in an axially symmetrical alignment and/or in the alignment state for the green (G) range defined in the present invention. The present invention defines the green (G) range for a color filter substrate as a pixel region in a colored layer corresponding to the respective pixels of red (R), green (G), and blue (B), the pixel region particularly corresponding to a portion of the colored layer which portion has a maximum absorption wavelength within a range from 520 to 570 nm.

In the present invention, a state in which the above axially symmetrical liquid crystal alignment is good refers to a state in which, when a white-display voltage is applied between upper and lower substrates of a liquid crystal display device that includes, for each pixel, an electrode opening in a corresponding electrode provided on a color filter colored layer which electrode opening is located at a predetermined position corresponding to the pixel, the center of axial symmetry (axial center) is stably formed within a region of the electrode opening. The above white-display voltage refers to, in the case where, for instance, a voltage is defined as having 256 gray levels, a voltage having the 256th gray level.

On the other hand, a state in which the liquid crystal alignment is defective refers to a state in which, under conditions similar to the above, (i) no center of axial symmetry (axial center) is formed or (ii) the center of axial symmetry (axial center) is formed at a position outside the region of the electrode opening.

EXAMPLES

The present invention is described below in further detail on the basis of specific Examples and the like. The present invention is, however, not limited to such examples.

Example 1

An Example of the present invention is described below with reference to FIGS. 1 and 2.

The present Example first prepared, as the color filter colored layer 12 included in the arrangement illustrated in FIG. 1, a color filter colored layer 12 for the colors of red (R), green (G), and blue (B) which color filter colored layer had, for the respective colors, pigment concentrations so adjusted and a thickness so set to 2.4 μm that the color reproduction range would be 72% in NTSC ratio when a normal pseudo-white LED was used as a backlight device.

The present Example, which set the thickness of the color filter colored layer 12 to 2.4 μm, was able to (i) decrease pigment concentrations as compared to a case in which the thickness was set to 1.5 μm and also (ii) maintain a relatively high specific resistance value of $3.0 \times 10^{15}$ (Ω·cm).

The present Examine used a counter electrode 13 including a predetermined, circular electrode opening 14 that is provided, with respect to each pixel electrode 16 on the active matrix (TFT) substrate 10 side, at a position corresponding to the vicinity of a central portion of each of the two rectangle electrodes making up the pixel electrode 16. The electrode opening 14 had a diameter set to approximately 15 μm.

It has been proven that a circular electrode opening 14 is simply required to measure at least 10 μm in order to function as an alignment control structure. While the electrode opening 14 is desirably small in terms of aperture ratio, it was set to measure approximately 15 μm as above in consideration of a production problem such as production dispersion.

The above arrangement (i) prevented, for example, a noticeable alignment disturbance from occurring in the pixel regions due to a voltage application, and (ii) caused no visible display deficiency such as a hue change as viewed in an oblique direction. The above arrangement thus achieved a high-quality display.

On the basis of the results shown in Example 1, the color filter colored layer 12 may have a thickness within a range of not less than 1.8 μm and not greater than 2.4 μm, or alternatively within a range of not less than 2.4 μm and not greater than 3.2 μm.

Example 2

The present Example conducted a comparative study on the visibility of a display carried out by a liquid crystal display device including a color filter colored layer having an arrangement similar to that of Example 1, the study involving various cases of that liquid crystal display device being set to have different color reproduction ranges. The following describes results of an evaluation based on the study.

[Display Visibility Evaluation]
<Purpose>
The present Example variously adjusted conditions for a color filter colored layer to evaluate an influence of the color reproduction range (in NTSC ratio) on display visibility.
<Evaluation Sample>
The present Example prepared, by (i) using a constituent material identical in kind to that of the color filter colored layer studied in Example 1 and (ii) adjusting pigment concentrations and thickness of the colored layer, a color filter substrate that was for use in evaluation and that had a color reproduction range different from that of the color filter colored layer studied in Example 1. The present Example then prepared, as in Example 1, a liquid crystal display device as illustrated in FIGS. 1 and 2, the liquid crystal display device serving as an evaluation target.
<Evaluation of Display Visibility>
The present Example determined the above color reproduction range (in NTSC ratio) and relative Y value for the liquid crystal display device (evaluation target) under an identical module luminance environment with use of color luminance meter BM-5A (produced by Topcon Corporation) located at a position that was a predetermined distance away from the liquid crystal display device.
<Evaluation Results>

TABLE 1

| NTSC ratio | Relative Y value | Colored layer thickness (μm) | G layer specific resistance value (Ω·cm) | Visibility |
| --- | --- | --- | --- | --- |
| 55% | 121% | 1.3 | $3.2 \times 10^{15}$ | B |
| 60% | 114% | 1.6 | $3.2 \times 10^{15}$ | P |
| 65% | 109% | 1.8 | $3.2 \times 10^{15}$ | A |
| 70% | 102% | 2.1 | $3.2 \times 10^{15}$ | E |
| 72% | 100% | 2.2 | $3.2 \times 10^{15}$ | E |
| 75% | 95% | 2.5 | $3.2 \times 10^{15}$ | E |
| 80% | 88% | 3.1 | $3.2 \times 10^{15}$ | V |

(Assessment Indexes for Determining Visibility)

The assessment indexes below show comparison with display quality of a conventional cathode ray tube (CRT) monitor.

B: Clearly poorer than CRT (recognized with the liquid crystal display device alone)

P: Poorer than CRT (level at which poorness is recognized at a side-by-side position)

A: Slightly poorer than CRT, but allowable

E: Substantially equivalent to CRT

V: More vivid than CRT

The term "side-by-side" refers to inspection that compares the two devices arranged next to each other. In other words, the "level at which poorness is recognized at a side-by-side position" refers to a level at which (i) by comparison of the liquid crystal display device as an evaluation target with a CRT placed next to the liquid crystal display device, the liquid crystal display device as an evaluation target has display quality that is recognized as poorer than that of the CRT, and (ii) from a contrary viewpoint, when the liquid crystal display device and the CRT are each individually observed, no difference in display quality is recognized.
<Conclusion>
This examination produces results which confirm that satisfying a condition of a color reproduction range (in NTSC ratio) of not less than 65% allows achievement of good display visibility as compared to a conventional cathode ray tube (CRT) monitor.

Comparative Example 1

Figure 16:
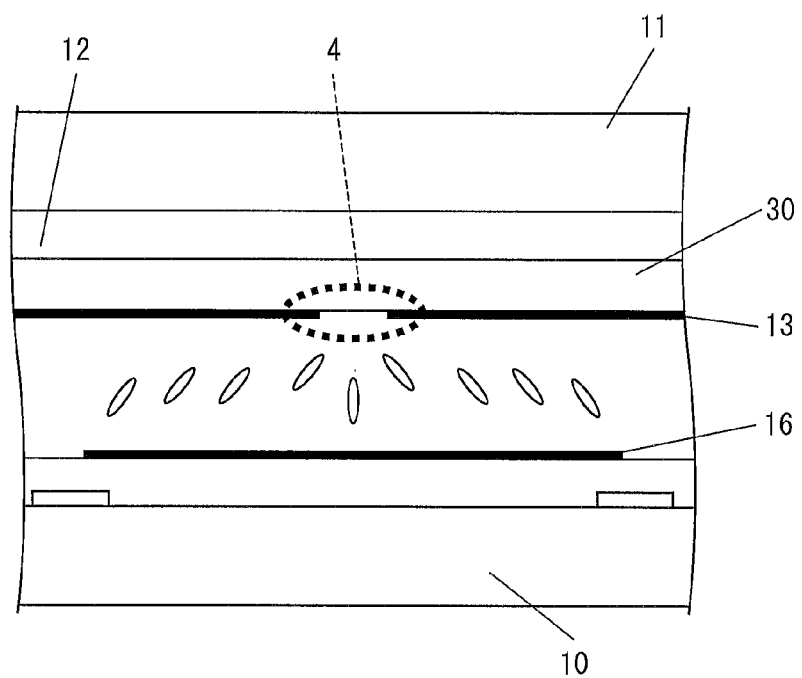
FIG. 16 is a view schematically illustrating a cross section of a pixel in a liquid crystal display device as Comparative Example 1.

The present Comparative Example differed from the above Example 1 only in that it included a different counter substrate 11 provided with a color filter colored layer 12. Specifically, the present Comparative Example included, as illustrated in FIG. 16: a color filter colored layer 12 for the individual colors; an overcoat layer 30 on the color filter colored layer; and a counter electrode 13 on the overcoat layer, the counter electrode including an electrode opening 14. The color filter colored layer 12 had a thickness set to 1.5 µm. The overcoat layer 30 had a thickness set to 2.0 µm.

Comparative Example 2

The present Comparative Example included no overcoat layer as in Example 1 above, and included a color filter colored layer 12 having a thickness set to 1.5 µm as in a conventional color filter substrate.

(Display Performance of Comparative Examples 1 and 2)

Comparative Examples 1 and 2 each required pigment concentrations for a colored layer that were higher than those of Example 1, and thus each had a low specific resistance value of $7.0 \times 10^{13}$ (Ω·cm). These Comparative Examples each consequently caused an alignment deficiency in particularly the green (G) pixel as illustrated in FIG. 7, and also led to observation of a hue change as viewed in an oblique direction.

(Simulation Carried Out of Alignment State on the Basis of Setting of Specific Resistance Value)

Figure 17:
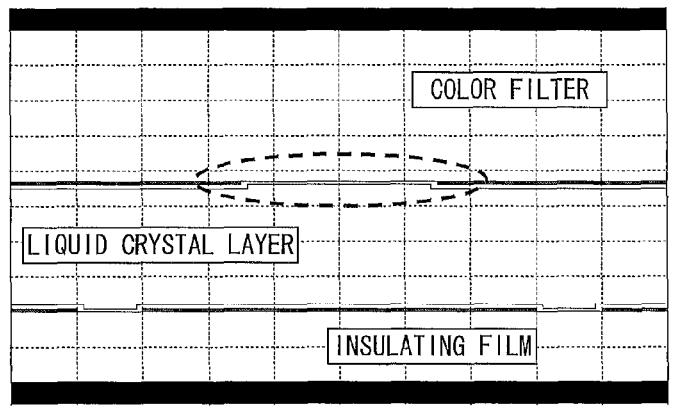
FIG. 17 is a diagram schematically illustrating a cross section of a pixel in a liquid crystal display device as Example 1.
Figure 18:
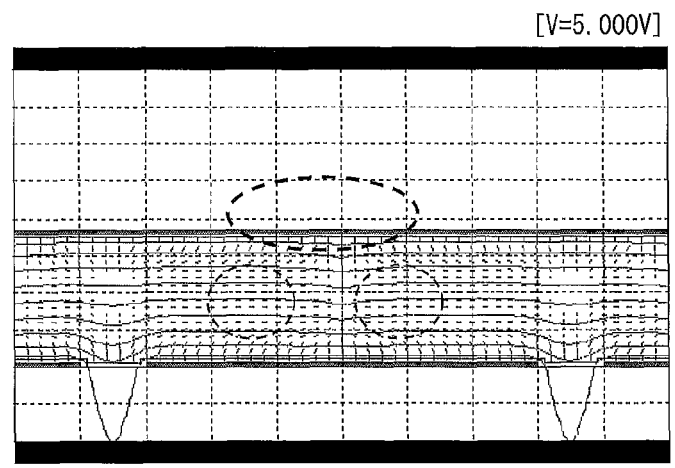
FIG. 18 is a diagram schematically illustrating a result of an electric field simulation for a case in which the liquid crystal display device of FIG. 17 includes a color filter colored layer having a low specific resistance value.
Figure 19:
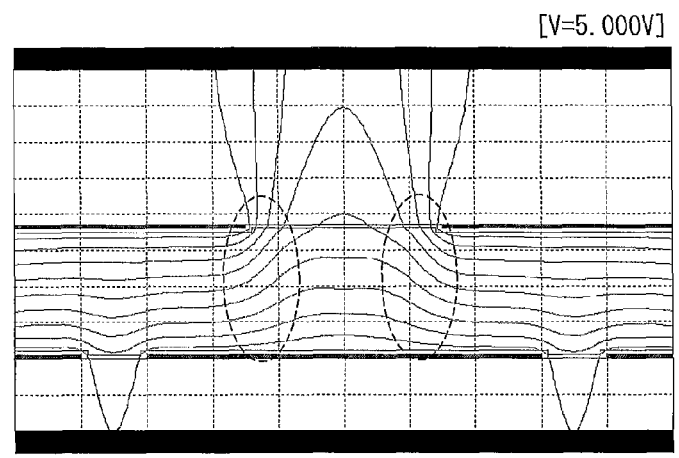
FIG. 19 is a diagram schematically illustrating a result of an electric field simulation for a case in which the liquid crystal display device of FIG. 17 includes a color filter colored layer having a high specific resistance value.

With reference to FIG. 17 through 19, the following discusses, on the basis of the relation between Example 1 and Comparative Example 2, the reason why an alignment state can be stabilized by (i) decreasing pigment concentrations for a color filter colored layer and (ii) increasing the thickness of the color filter colored layer, so as to increase the specific resistance value.

FIG. 17 is a cross-sectional diagram schematically illustrating the two liquid crystal display devices. The simulation conducted was an electric field simulation of how an equipotential line was generated in a state in which a voltage of 5 V was being applied between upper and lower substrates, and examined the alignment state of liquid crystal on the basis of results of the simulation. A state of the color filter colored layer in which state it had a low specific resistance value (that is, a case similar to Comparative Example 2) was approximated to a state of a conductor. FIG. 18 illustrates a result of that simulation. On the other hand, in a state in which the color filter colored layer had a high specific resistance value (that is, a case similar to Example 1), the color filter layer was approximated to an insulator. FIG. 19 illustrates a result of that simulation. The two results are compared as follows.

A high specific resistance value for the color filter colored layer caused an equipotential line to slide into the vicinity of an electrode opening as illustrated in FIG. 19 and thus allowed an oblique electric field to be generated efficiently. This suggests that a radial liquid crystal alignment can be achieved.

In contrast, a low specific resistance value for the color filter colored layer (which is then similar to a conductor) did not allow an oblique electric field to be generated sufficiently (see FIG. 18). This confirms that liquid crystal molecules in this case have an unfixed, unstable electroclinic alignment.

This confirmation suggests that setting a high specific resistance value for the color filter substrate is important in terms of alignment stability.

The present Example confirmed that (i) by including a color filter colored layer having a large thickness, it is possible to decrease pigment concentrations as compared to conventional equivalents and consequently increase a specific resistance value, and that (ii) as a result, it is possible to more effectively achieve an electroclinic effect for a vertical alignment display and significantly improve orientation.

Examples 3 and 4

The present Examples each had, in a liquid crystal display device of the vertical alignment display mode, a pixel design involving a liquid crystal domain alignment which was different from that of Example 1 above. For example, Example 3 (see FIG. 20, which is a plan view schematically illustrating a liquid crystal display device of Example 3) is a variation which includes, in respective upper and lower substrates, linear and periodically bent alignment controlling structures that extend in respective directions different from each other. Further, the alignment controlling structures in the upper substrate are combined alternately with the alignment controlling structures in the lower substrate in parallel thereto. This achieves a four-domain alignment within each pixel.

Specifically, the electrode opening 14 provided on the counter substrate 11 side includes, within a pixel, (i) a plurality of first linear sections 14a each extending in a first direction and (ii) second linear sections 14b extending in a second direction, which is different from the first direction. Each adjacent two of the first linear sections 14a are substantially parallel to each other. The first direction and the second direction form an angle of substantially 90°. Each adjacent two of the second linear sections 14b are, needless to say, also substantially parallel to each other.

On the other hand, the pixel electrode 16 includes at least one opening or notch section that is provided at a predetermined position with the pixel and that serves to control the alignment of liquid crystal. The opening or notch section includes (i) a plurality of third linear sections 31a extending in the first direction within the pixel and (ii) a plurality of fourth linear sections 31b extending in the second direction, which is different from the first direction. In the case where the counter electrode 13 and the pixel electrode 16 are provided respectively on upper and lower inner surfaces between which the liquid crystal layer 17 is interposed, (i) the first linear sections 14a and the third linear sections 31a are parallel to each other and provided alternately at a predetermined distance from each other, and (ii) the second linear sections 14b and the fourth linear sections 31b are also parallel to each other and provided alternately at a predetermined distance from each other.

Figure 20:
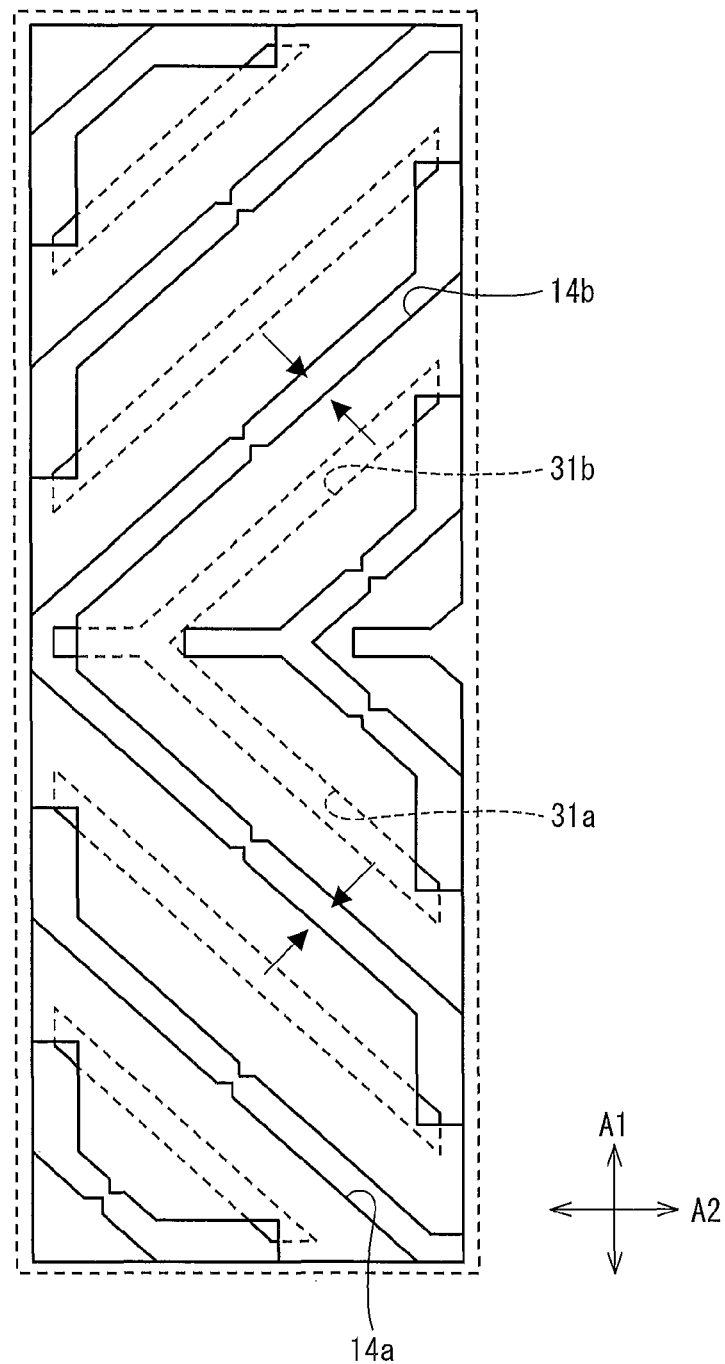
FIG. 20 is a plan view schematically illustrating an example of respective configurations of upper and lower substrates included in a liquid crystal display device of Example 2.

With the above arrangement, the present Example 3 can, for each pixel, generate a periodic four-domain alignment in response to a voltage application, which four-domain alignment has electroclinic directions indicated by the arrows in FIG. 20. These electroclinic directions each correspond to (i) a direction that crosses the first direction toward the first linear sections 14a or (ii) a direction that crosses the second direction toward the second linear sections 14b. This arrangement consequently makes it possible to carry out a display having a wide viewing angle.

Example 4 (see FIG. 21, which is a plan view schematically illustrating an active matrix substrate 10 of a liquid crystal display device of Example 4) included, on the active matrix substrate, a pixel electrode including periodically formed, fine slit openings in a fishbone shape. This arrangement defines relative positions of slit openings for respective upper and lower substrates in order to efficiently form liquid crystal domains each in a direction parallel to finely formed slits with use of an electroclinic effect caused by generation of an electric field between the upper and lower substrates.

Specifically, the pixel electrode 16 includes, within a pixel and as the above opening or notch section, at least (i) a first fine pattern having a plurality of first branch sections 32a extending in the first direction and (ii) a second fine pattern having a plurality of second branch sections 32b extending in a second direction, which is different from the first direction. The first direction and the second direction both extend toward the center of the pixel. With this arrangement, (i) the first fine pattern forms a domain in which liquid crystal molecules are aligned along an electroclinic direction L1 corresponding to the first direction, and (ii) the second fine pattern forms a domain in which liquid crystal molecules are aligned along an electroclinic direction L2 corresponding to the second direction.

The pixel electrode 16 further includes (i) a third fine pattern symmetrical in shape to the first fine pattern with respect to a center line My between two source lines 4 sandwiching the pixel electrode and (ii) a fourth fine pattern symmetrical in shape to the second fine pattern with respect to the center line My. The first fine pattern is in symmetrical relation with the second fine pattern with respect to a center line Mx between two gate lines 2 sandwiching the pixel electrode 16, whereas the third fine pattern is in symmetrical relation with the fourth fine pattern with respect to the center line Mx.

With the above arrangement, (i) the third fine pattern forms a domain in which liquid crystal molecules are aligned along an electroclinic direction L3 corresponding to the direction opposite to the second direction, and (ii) the third fine pattern forms a domain in which liquid crystal molecules are aligned along an electroclinic direction L4 corresponding to the direction opposite to the first direction. The above first to fourth fine patterns form four different domains within a single pixel that have respective electroclinic directions different from one another.

Figure 21:
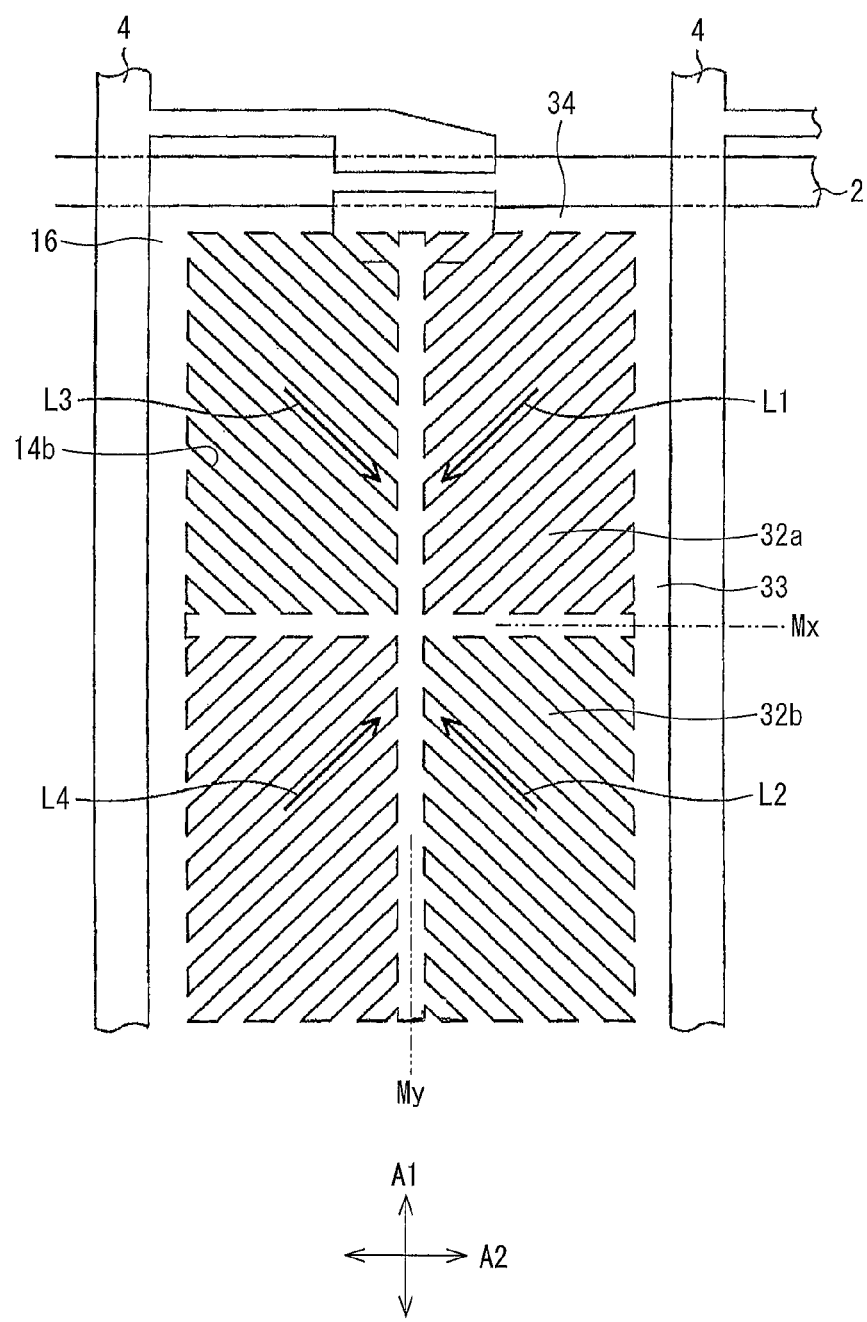
FIG. 21 is a plan view schematically illustrating an example active matrix substrate included in a liquid crystal display device of Example 3.

The pixels each have a maximum luminance for each gray level in the case where, as illustrated in FIGS. 20 and 21, the first direction and the second direction each form an angle of 45° with respect to a corresponding one of respective absorption axes A1 and A2, orthogonal to each other, of polarizing plates that are provided for respective outer surfaces of the active matrix substrate 10 and the counter substrate 11.

As described above, each of Examples 2 and 3 above can also produce the above effect of improving alignment stability and reliability.

Example 5

The present Example prepared an active matrix substrate 10 having the above COF structure, and included on the active matrix substrate 10 a color filter colored layer 12 which had, for the respective colors of red (R), green (G), and blue (B), pigment concentrations so adjusted and a thickness so set to 2.2 μm that the color reproduction range would be 72% in NTSC ratio when a normal pseudo-white LED was used as a backlight device.

The present Example formed, in each pixel region of the counter substrate 11, a counter electrode 13 including a predetermined electrode opening 14. The present Example carried out a process similar to that of, for example, Example 1 to attach the two substrates to each other. This produced a liquid crystal display device.

The liquid crystal display device of the present Example, which set the thickness of the color filter colored layer 12 to 2.2 μm, was able to (i) decrease pigment concentrations for the colored layer and (ii) maintain a relatively high specific resistance value of $3.2 \times 10^{15}$ (Ω·cm). The present Example thus also (i) prevented, for example, a noticeable alignment disturbance from occurring in the pixel regions due to a voltage application, and (ii) caused no visible display deficiency such as a hue change as viewed in an oblique direction. The present Example thus achieved a high-quality display.

The following supplementally describes features of the above display devices of the present invention.

On the basis of a similar technical concept, the present invention may further be arranged such that the colored layer is provided in a layer below the pixel electrode provided above the at least one active element on the inner surface of the first substrate. The present invention is thus not limited to the arrangement of including a colored layer on the side of the second substrate provided with the counter electrode, but useful also for the arrangement of including a colored layer on the side of the first substrate.

In the case where the colored layer is provided on the side of the second substrate, the counter electrode is provided directly on the colored layer. In the case where the colored layer is provided on the side of the first substrate, the pixel electrode is directly provided on the colored layer. In either case, no overcoat layer is provided for the colored layer. The above arrangement can consequently simplify a process of producing a liquid crystal display device and reduce costs.

In the case where the pixel electrode is provided directly on the colored layer, it is possible to mass-produce a display device that is high in aperture ratio and definition even with a slightly low accuracy in attaching the first substrate and the second substrate to each other.

The liquid crystal display device of the present invention is arranged such that it has a color reproduction range of at least 65% in NTSC ratio. With this arrangement, at least 65% in NTSC ratio is achieved for particularly a green colored layer, which has a high pigment concentration among the colored layers and which thus tends to have a liquid crystal region in which the alignment state is unstable. The above arrangement, in consequence, advantageously contributes to improvement in display quality such as excellent color reproducibility.

The liquid crystal display device of the present invention is arranged such that the at least one electrode opening included in the counter electrode is provided in a vicinity of a central portion of at least one liquid crystal region formed within the each of pixels.

Specifically, the present invention provides a liquid crystal display element that can achieve an all-direction alignment by causing liquid crystal molecules to be aligned, in response to a voltage application, radially around the symmetry center positioned in the vicinity of an electrode opening within a liquid crystal region. This arrangement thus makes it possible to produce a display device that is extremely excellent in symmetry of a viewing angle characteristic.

The above arrangement is relatively simple, and is thus characteristically easily applicable to a small- to middle-sized liquid crystal display device that is of a vertical alignment type and that has a relatively small pixel pitch.

Further, even in the case where a single pixel is divided into a plurality of sub-regions, the above arrangement can achieve, for each sub-region, a radial domain having its center in the vicinity of an electrode opening provided at a substantially central portion of the sub-region. The above arrangement thus allows liquid crystal molecules in each liquid crystal region to perform self optical compensation, and can consequently achieve a wide viewing angle.

The liquid crystal display device of the present invention is arranged to include, within a single pixel, first linear sections and second linear sections in a counter electrode as the electrode opening, the first linear sections and second linear sections extending in respective directions different from each other and form an angle of substantially 90°. This arrangement makes it possible to form a domain in which liquid crystal molecules are aligned, in response to a voltage application, uniformly in directions orthogonal to the first and second linear sections. The above arrangement can thus achieve a multi-alignment within each pixel, and can consequently achieve a display having a wide viewing angle.

The above arrangement is widely applicable to, for example, a large-sized liquid crystal display device that is of the vertical alignment (VA) display mode and that has a relatively large pixel pitch.

The liquid crystal display device of the present invention is arranged such that within a single pixel, third linear sections and fourth linear sections, both serving as an opening or notch section in the pixel electrode, (i) extend in respective directions different from each other and (ii) are provided so that the first linear sections and the third linear sections are parallel to each other and provided individually alternately at a predetermined distance from each other and that the second linear sections and the fourth linear sections are parallel to each other and provided individually alternately at the predetermined distance from each other. This arrangement makes it possible to efficiently achieve four different domains within a single pixel that have respective alignments different from one another. Further, in the case where the alignment directions each form an angle of 45° with respect to absorption axes of polarizing plates, it is advantageously possible to design a liquid crystal display device in which (i) no light is lost due to a birefringence component and (ii) the relative transmittance is at its maximum.

The liquid crystal display device of the present invention is arranged such that the pixel electrode includes, provided at a predetermined position within a single pixel, at least one opening or notch section for controlling the alignment of liquid crystal. This arrangement makes it possible to (i) further stabilize the alignment state in each liquid crystal region for a case in which a voltage of not lower than a threshold voltage is being applied, and thus advantageously (ii) achieve high display quality.

The liquid crystal display device of the present invention is arranged such that the pixel electrode includes, as the opening or notch section, fine patterns each having a plurality of branch sections and extend in two respective different directions that each form an angle of 45° with respect to absorption axes of polarizing plates. This arrangement advantageously makes it possible to efficiently achieve a multi-alignment in each pixel and improve the relative transmittance.

The liquid crystal display device of the present invention is further arranged such that the fine patterns having the two respective different directions extend from a structural pattern of a trunk section 33 (illustrated in FIG. 21) provided in the pixel electrode. With this arrangement, the liquid crystal display device can achieve a multi-alignment having higher quality.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

INDUSTRIAL APPLICABILITY

The present invention is applicable to (i) a liquid crystal display element suitable for carrying out a high-definition information display for an observer present at a relatively small distance from the liquid crystal display element, and (ii) a display device including that liquid crystal display element. More specifically, the present invention is widely applicable to a liquid crystal display device suitable for use in (i) a small-to middle-sized liquid crystal panel to be mounted in a device such as a mobile telephone, a personal digital assistant (PDA), portable game equipment, portable video equipment, car navigation equipment, a video camera, and a digital camera or (ii) large-sized audio-visual liquid crystal display equipment such as a large-screen television measuring 30 or more inches diagonally.

REFERENCE SIGNS LIST

1 liquid crystal display device
5 sub-pixel region
6 TFT (active element)
10 active matrix substrate (first substrate)
11 counter substrate (second substrate)
12 color filter colored layer
13 counter electrode
14 electrode opening
14a first linear section
14b second linear section
16 pixel electrode
17 liquid crystal layer
18 liquid crystal molecule
20 insulating layer (overcoat layer)
31a third linear section
31b fourth linear section
32a first branch section
32b second branch section
d thickness (layer thickness)

The invention claimed is:
1. A liquid crystal display device comprising:
a first substrate;
a second substrate provided so as to face the first substrate; and
a liquid crystal layer provided between the first substrate and the second substrate, the liquid crystal layer having negative dielectric anisotropy and achieving a substantially vertical alignment state while no voltage is being applied,
the first substrate having an inner surface on which (i) at least one active element and (ii) a pixel electrode connected to the at least one active element which are formed on an inner surface of the first substrate,
(iii) a predetermined color filter colored layer are provided for each of pixels,
the liquid crystal display device further comprising:
a counter electrode provided at a predetermined position within said each of pixels and including at least one electrode opening,
wherein:
an overcoat layer for covering the color filter colored layer is not provided between the color filter colored layer and the liquid crystal layer; and
the color filter colored layer has (i) a layer thickness of not less than 1.8 μm and not greater than 3.2 μm and (ii) a specific resistance value of not less than $1.0 \times 10^{15}$ Ω·cm.
2. The liquid crystal display device according to claim 1, wherein:
the first substrate is provided with the color filter colored layer, and the color filter colored layer is provided in a layer below the pixel electrode provided above the at least one active element on the inner surface of the first substrate.

3. The liquid crystal display device according to claim 1, wherein:

the second substrate is provided with the color filter colored layer, and the counter electrode is provided directly on the color filter colored layer.

4. The liquid crystal display device according to claim 1, wherein:

the liquid crystal display device has a color reproduction range of at least 65% in NTSC ratio.

5. The liquid crystal display device according to claim 1, wherein:

the at least one electrode opening included in the counter electrode is provided in a vicinity of a central portion of at least one liquid crystal region formed within said each of pixels.

6. The liquid crystal display device according to claim 1, wherein:

the at least one electrode opening provided on a side of the counter substrate includes, within said each of pixels, (i) a plurality of first linear sections extending in a first direction and (ii) a plurality of second linear sections extending in a second direction different from the first direction;

adjacent two of the plurality of first linear sections are substantially parallel to each other; and the first direction and the second direction form an angle of substantially 90°.

7. The liquid crystal display device according to claim 6, wherein:

the pixel electrode includes at least one opening or notch section provided at a predetermined position within said each of pixels and serving to control alignment of liquid crystal;

the at least one opening or notch section includes, within said each of pixels, (i) a plurality of third linear sections extending in the first direction and (ii) a plurality of fourth linear sections extending in the second direction different from the first direction; and in a case where the counter electrode and the pixel electrode are provided respectively on upper and lower inner surfaces between which the liquid crystal layer is interposed, (i) the plurality of first linear sections and the plurality of third linear sections are parallel to each other and provided individually alternately at a predetermined distance from each other, and (ii) the plurality of second linear sections and the plurality of fourth linear sections are parallel to each other and provided individually alternately at the predetermined distance from each other.

8. The liquid crystal display device according to claim 1, wherein:

the pixel electrode includes at least one opening or notch section provided at a predetermined position within said each of pixels and serving to control alignment of liquid crystal.

9. The liquid crystal display device according to claim 8, wherein:

the pixel electrode includes, within said each of pixels and as the at least one opening or notch section, at least (i) a first fine pattern having a plurality of first branch sections extending in a first direction and (ii) a second fine pattern having a plurality of second branch sections extending in a second direction different from the first direction; and either the first direction or the second direction forms an angle of 45° with respect to respective absorption axes, orthogonal to each other, of polarizing plates that are provided respectively for respective outer surfaces of the first and second substrates.

10. The liquid crystal display device according to claim 9, wherein:

the pixel electrode has a structural pattern including a trunk section extending in a direction in which the pixels are arranged; and the plurality of first branch sections extend from the trunk section in the first direction, whereas the plurality of second branch sections extend from the trunk section in the second direction.

\* \* \* \* \*